US012623840B2

(12) United States Patent
Ueda et al.

(10) Patent No.: US 12,623,840 B2
(45) Date of Patent: May 12, 2026

(54) TRANSPORT VEHICLE

(71) Applicant: Daifuku Co., Ltd., Osaka (JP)

(72) Inventors: Yuichi Ueda, Hinocho (JP); Masashige Iwata, Hinocho (JP); Kazunari Kimura, Hinocho (JP); Satoshi Horie, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 433 days.

(21) Appl. No.: 18/370,160

(22) Filed: Sep. 19, 2023

(65) Prior Publication Data

US 2024/0092568 A1 Mar. 21, 2024

(30) Foreign Application Priority Data

Sep. 20, 2022 (JP) ................................. 2022-148970

(51) Int. Cl.
*B65G 1/04* (2006.01)
*B65G 1/06* (2006.01)

(52) U.S. Cl.
CPC ........... *B65G 1/0407* (2013.01); *B65G 1/065* (2013.01)

(58) Field of Classification Search
CPC .............................. B65G 1/0407; B65G 1/065
See application file for complete search history.

(56) References Cited

U.S. PATENT DOCUMENTS

| | | | | |
|---|---|---|---|---|
| 4,534,692 A | * | 8/1985 | Shiomi | B23Q 7/10 |
| | | | | 414/282 |
| 4,787,804 A | * | 11/1988 | Edenas | B66F 9/07 |
| | | | | 414/254 |
| 7,931,431 B2 | * | 4/2011 | Benedict | B63B 25/22 |
| | | | | 414/137.1 |
| 8,954,188 B2 | * | 2/2015 | Sullivan | G05D 1/225 |
| | | | | 700/214 |
| 10,207,867 B2 | * | 2/2019 | Brumm | B65G 1/02 |
| 2021/0237971 A1 | * | 8/2021 | Zhang | B65G 1/0464 |

FOREIGN PATENT DOCUMENTS

JP             6313087 B2      4/2018

* cited by examiner

*Primary Examiner* — Jonathan Snelting
(74) *Attorney, Agent, or Firm* — The Webb Law Firm

(57) ABSTRACT

An overturning prevention device includes a shaking occurrence information acquisition section configured to acquire shaking occurrence information indicating that shaking of a travel face where a moving body travels is equal to or more than a predetermined reference value; a support arm supported by the moving body; and an arm driving device configured to drive the support arm. The support arm is configured to be changeable between a projecting state where the support arm projects outwardly in a vehicle-body width direction from the moving body to be grounded on a travel face outside the moving body in the vehicle-body width direction and a retracted state where the support arm is retracted inside a width dimension of the moving body.

7 Claims, 11 Drawing Sheets

START

1 ROUTE DIRECTED FROM INTER-SHELF REGION OR END REGION TO OUTSIDE REGION ?

No

Yes

2 LAST TRANSFERRING IN INTER-SHELF REGION OR END REGION COMPLETED ?

No

Yes

3 EXECUTE GRAVITATIONAL CENTER LOWERING CONTROL

4 MAINTAIN GRAVITATIONAL CENTER LOWERING CONTROL AFTER MOVING BODY MOVES OUT TO OUTSIDE REGION BUT BEFORE EXECUTION OF SUBSEQUENT TRANSFERRING

END

TRANSPORT VEHICLE

CROSS-REFERENCE TO RELATED APPLICATION

This application claims priority to Japanese Patent Application No. 2022-148970 filed Sep. 20, 2022, the disclosure of which is hereby incorporated by reference in its entirety.

BACKGROUND OF THE INVENTION

1. Field of the Invention

The present invention relates to a transport vehicle for transporting an article.

2. Description of the Related Art

In recent years, measures for earthquake have been taken in various fields. The same can be said about a facility such as an automated storage and retrieval unit in which articles are automatically stored, accommodated, and transported.

As one of the measures for earthquake, in an automated storage and retrieval unit disclosed in Japanese Patent No. 6313087 (Patent Literature 1), for example, in a case where earthquake information is received, a boarding ramp (28) of a stacker crane (10) is moved to a retraction position set on the stairhead of a rack (4). Hereby, in the automated storage and retrieval unit disclosed in Patent Literature 1, it is possible to restrain the boarding ramp (28) from being damaged by a package (W) falling from the rack (4) at the time when an earthquake occurs.

SUMMARY OF THE INVENTION

In the stacker crane (10), a lower wagon (26) and an upper wagon (32) are guided by respective rails (12, 36), so that the stacker crane (10) is less likely to overturn due to shaking of an earthquake or the like. However, even a transport vehicle for transporting an article in a transport facility provided with no rail for guiding an upper part of the transport vehicle may overturn due to shaking of an earthquake or the like in a case where the dimension of the transport vehicle in its up-down direction is large.

In view of this, it is desired to create a transport vehicle that is hard to overturn due to shaking of an earthquake, or the like.

A transport vehicle according to this disclosure is a transport vehicle for transporting an article and includes: a moving body configured to travel along a travel path; a transfer device configured to transfer the article; and an overturning prevention device configured to prevent overturn. The transfer device includes: a mast fixed to the moving body and disposed along an up-down direction; a raising-lowering body configured to be raised and lowered along the mast; and a transfer machine supported by the raising-lowering body. When a direction where the moving body travels is defined as a vehicle-body front-rear direction, a direction perpendicular to the vehicle-body front-rear direction in a top-bottom view is defined as a vehicle-body width direction, a dimension of the moving body in the vehicle-body front-rear direction is defined as a length dimension, a dimension of the moving body in the vehicle-body width direction is defined as a width dimension, and a height from a bottom end of the moving body to an upper end of the mast is defined as a height dimension, the length dimension and the height dimension are larger than the width dimension. The overturning prevention device includes: a shaking occurrence information acquisition section configured to acquire shaking occurrence information indicating that shaking of a travel face where the moving body travels is equal to or more than a predetermined reference value; a support arm supported by the moving body; and an arm driving device configured to drive the support arm. The support arm is configured to be changeable between a projecting state where the support arm projects outwardly in the vehicle-body width direction from the moving body to be grounded on the travel face outside the moving body in the vehicle-body width direction and a retracted state where the support arm is retracted inside the width dimension of the moving body. In a case where the shaking occurrence information acquisition section acquires the shaking occurrence information, the arm driving device executes an arm projecting operation to change the support arm from the retracted state to the projecting state.

In a case where the length dimension and the height dimension of the transport vehicle are larger than the width dimension thereof, when shaking of the travel face occurs due to an earthquake or other factors, the transport vehicle easily inclines greatly in the vehicle-body width direction or overturns.

However, with the above configuration, when shaking occurrence information is acquired, the support arm is brought into the projecting state such that the support arm can be grounded on the travel face outside the moving body. Accordingly, even in a case where shaking occurs on the travel face, it is possible to restrict the transport vehicle from greatly inclining in the vehicle-body width direction and eventually to prevent the transport vehicle from overturning. That is, with the above configuration, it is possible to achieve a transport vehicle that is hard to overturn by shaking of an earthquake or the like.

Further features and advantages of the technology according to this disclosure will become clearer by the following illustrative and nonlimiting description of embodiments to be described with reference to the drawings.

DESCRIPTION OF THE PREFERRED EMBODIMENTS

A transport vehicle is configured to transport an article. The following describes an embodiment of the transport vehicle with reference to an example in which the transport vehicle is provided in a transport facility for transporting a container. In the present embodiment, the transport vehicle travels along the front surface of a container shelf where containers are stored and transports a container. That is, in the present embodiment, the container corresponds to an "article," and the container shelf where containers are stored corresponds to a "storage shelf."

Figure 1:
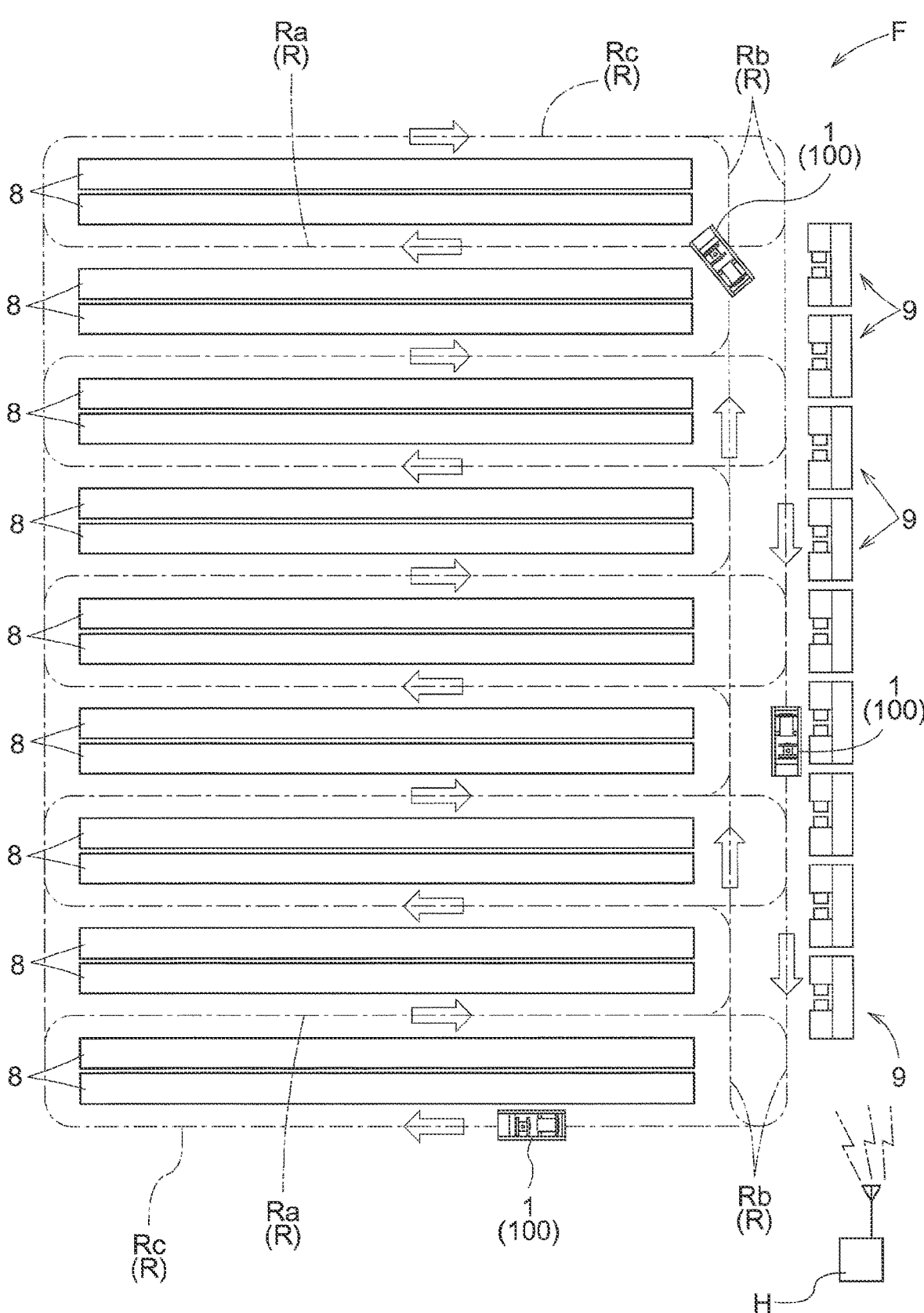
FIG. 1 is a plan view of a transport facility including a transport vehicle.

As illustrated in FIG. 1, a transport facility F includes a container shelf 8 for storing a container 70 (see FIG. 3), a carrying in-out section 9 for carrying the container 70 in and out of the transport facility F, and a host controller H for managing the whole facility. The transport vehicle 100 transports, to the container shelf 8, the container 70 carried in from the carrying in-out section 9, or the transport vehicle 100 transports the container 70 stored in the container shelf 8 to the carrying in-out section 9 to carry the container 70 out of the transport facility F.

In the present embodiment, a plurality of container shelves 8 is disposed in parallel to each other at predetermined intervals. At least the front surface of each of the plurality of container shelves 8 is opened such that the container 70 is taken in and out at the front surface. Part of a travel path R for a moving body 1 (a transport vehicle 100) is set between paired container shelves 8 adjacent to each other with their front surfaces facing each other. In other words, the paired container shelves 8 adjacent to each other are disposed in parallel to each other at an interval, and part of the travel path R is set to pass through between the paired container shelves 8. Further, the container shelf 8 disposed on the endmost side among the plurality of container shelves 8 provided in the transport facility F is disposed with its front surface facing outward, and part of the travel path R is also set in a region along the front surface of the container shelf 8 on the endmost side. Further, a plurality of carrying in-out sections 9 is provided in the transport facility F, and part of the travel path R is also set in a region passing through each of the plurality of carrying in-out sections 9.

The travel path R includes a shelf inside path Ra provided between paired container shelves 8 along the front surfaces of the container shelves 8 such that the shelf inside path Ra extends in the extending direction of the container shelves 8, an end path Rc provided along the front surface of the container shelf 8 disposed on the endmost side among the plurality of container shelves 8 such that the end path Re extends in the extending direction of the container shelf 8 disposed on the endmost side, and a shelf outside path Rb set outside an arrangement region for the container shelves 8. The shelf inside path Ra is set for each of the plurality of container shelves 8. In the present embodiment, the part of the travel path R that is set in the region between the paired container shelves 8 adjacent to each other with their front surfaces facing each other corresponds to the shelf inside path Ra. Further, the part of the travel path R that is set in the region along the front surface of the container shelf 8, the front surface facing outward, corresponds to the end path Rc. Further, the shelf outside path Rb is set to connect a plurality of shelf inside paths Ra to each other. Further, the shelf outside path Rb is also set to pass through each of the plurality of carrying in-out sections 9. In the present embodiment, part in the travel path R other than the shelf inside path Ra and the end path Rc corresponds to the shelf outside path Rb.

Figure 2:
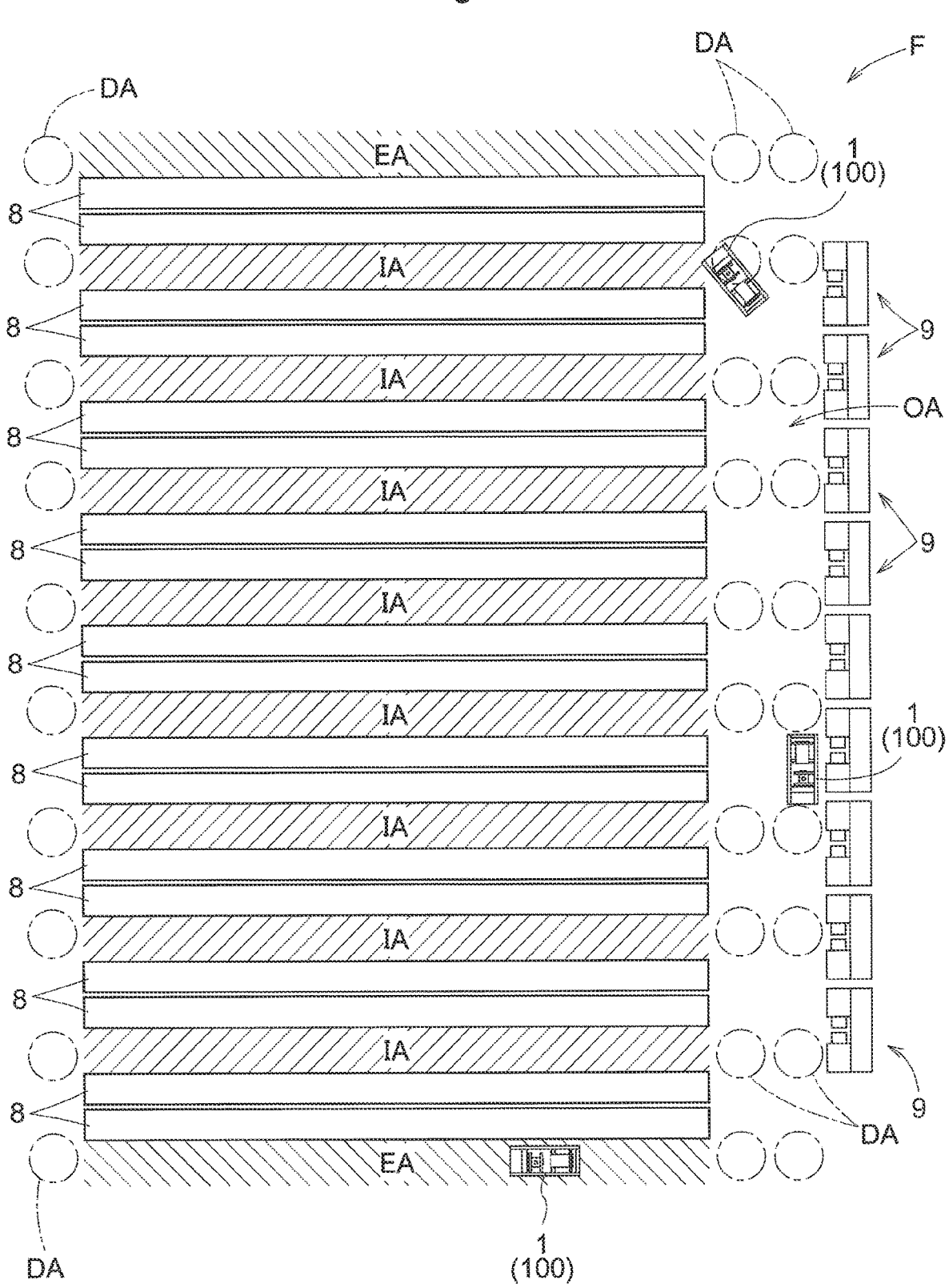
FIG. 2 is a plan view illustrating each region where a moving body travels.

As illustrated in FIG. 2, an inter-shelf region IA, an end region EA, and an outside region OA where the moving body 1 travels are set in the transport facility F. In the present embodiment, a direction change region DA is further set in the transport facility F. Note that, in the present embodiment, the end region EA and the outside region OA correspond to an "outer region."

The inter-shelf region IA is a region set between paired container shelves 8 along the front surfaces of the paired container shelves 8. The whole inter-shelf region IA faces the front surfaces of the container shelves 8 corresponding to the inter-shelf region IA. In other words, the inter-shelf region IA extends in the extending direction of the container shelves 8 corresponding to the inter-shelf region IA, along the front surfaces of the container shelves 8. The dimension of the inter-shelf region IA in the extending direction and the dimension of the container shelves 8 in the extending direction are equal to each other.

Further, the inter-shelf region IA is a region through which the shelf inside path Ra (see FIG. 1) passes and a region where the moving body 1 traveling on the shelf inside path Ra faces the front surfaces of the container shelves 8.

The end region EA is a region set along the container shelf 8 disposed on the endmost side among the plurality of container shelves 8. The whole end region EA faces the front surface of the container shelf 8 corresponding to the end region EA. In other words, the end region EA extends in the extending direction of the container shelf 8 corresponding to the end region EA along the front surface of the container shelf 8. The dimension of the end region EA in the extending direction and the dimension of the container shelf 8 in the extending direction are equal to each other.

Further, the end region EA is a region where the end path Rc (see FIG. 1) passes and a region where the moving body 1 traveling on the end path Rc faces the front surface of the container shelf 8.

The outside region OA is a region in the transport facility F other than the inter-shelf region IA and the end region EA. The outside region OA is a region through which the shelf outside path Rb passes. In the present embodiment, the direction change region DA is set in each of a plurality of parts in the outside region OA. The direction change region DA is a region where the moving body 1 changes its advancing direction. Some direction change regions DA are set in parts where a plurality of travel paths R (shelf outside paths Rb) intersects with each other. Although details are described later, the moving body 1 according to the present embodiment changes its advancing direction by rotating on the spot around an axial center along the up-down direction in the direction change region DA.

[Container Shelf]

Figures 3, 4:
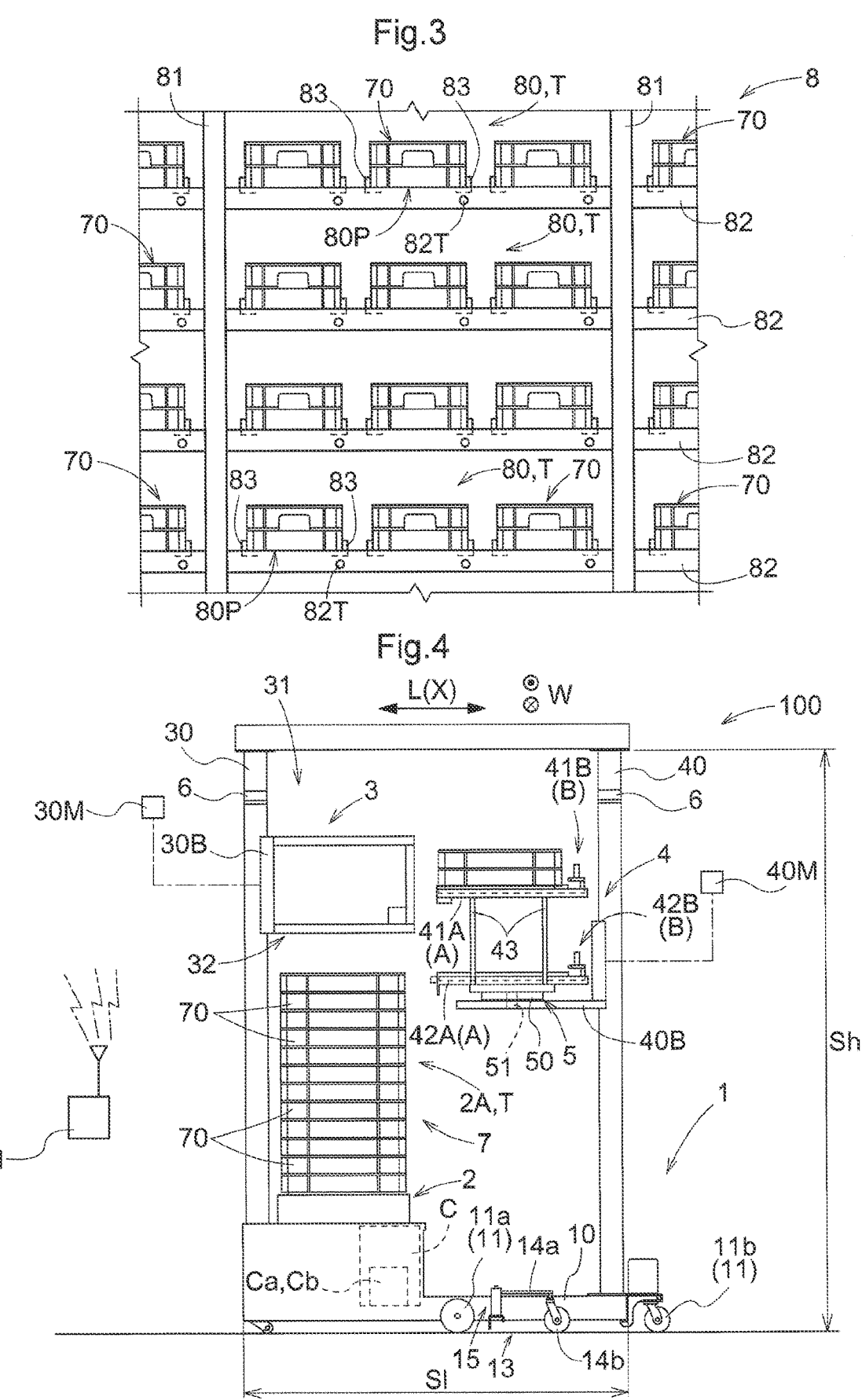
FIG. 3 is a front view of a container shelf.
FIG. 4 is a view of the transport vehicle viewed in a vehicle width direction.

As illustrated in FIG. 3, the container shelf 8 includes a plurality of shelf sections 80 for storing the containers 70 in the up-down direction. In the present embodiment, the container shelf 8 includes a plurality of beam members 82 extending horizontally along the front surface of the container shelf 8, and a plurality of support members 81 extending along the up-down direction and connected to the plurality of beam members 82, respectively. That is, the container shelf 8 includes a support frame constituted by combining the plurality of support members 81 with the plurality of beam members 82.

The plurality of beam members 82 is disposed to be distanced from each other in the up-down direction. A mounting member 83 on which the container 70 is placed is connected to each of the plurality of beam members 82. In this example, the container 70 is placed on paired mounting members 83, so that the container 70 is stored in the shelf section 80. Further, a plurality of sets of paired mounting members 83 is disposed in the shelf section 80 such that a plurality of containers 70 is storable in one shelf section 80. Note that, in this example, a region between paired support members 81 adjacent to each other in a width direction (a right-left direction) in a front view illustrated in FIG. 3 and between paired beam members 82 adjacent to each other in the up-down direction corresponds to an opening of the container shelf 8.

In the present embodiment, at a reference position 80P where the container 70 is stored in the shelf section 80, a target mark 82T as a target for storing the container 70 at the reference position 80P is provided. In this example, the target mark 82T is provided in the beam member 82. One target mark 82T is provided for one pair of mounting members 83. In the example illustrated herein, the target mark 82T is constituted by a hole formed in the beam member 82.

[Container]

The container 70 is a transport target to be transported by the transport vehicle 100. Although details are not illustrated herein, the container 70 is formed in a box shape having an opening opened upward. In this example, the outer shape of the container in a top-bottom view has a rectangular shape. Inside the container 70, a predetermined to-be-stored object is storable. Examples of the to-be-stored object include various products such food and consumption goods, or components or half-finished goods used in production lines in a factory or the like, for example.

In the present embodiment, the container 70 is configured such that another container 70 can be staked on the container 70 in a state where the to-be-stored object is stored in the container 70. That is, the containers 70 are configured to be stackable in the up-down direction (see FIG. 4). In this example, two containers 70 are stacked in the up-down direction such that the bottom part of one of the two containers 70 is fitted into the opening of the other one of the two containers 70 from the upper side.

[Transport Vehicle]

As illustrated in FIG. 4, the transport vehicle 100 includes the moving body 1 configured to travel along a predetermined travel path R, a transfer device 4 configured to transfer the container 70, an overturning prevention device 13 configured to prevent overturning of the transport vehicle 100, and a control unit C configured to control the transfer device 4 and the overturning prevention device 13. In the present embodiment, the transport vehicle 100 includes a container group support section 2 configured to support a plurality of containers 70 within a predetermined stacking region 2A as a container group 7 in a stacking state, and a lifting device 3 configured to lift the containers 70 in the container group 7 supported by the container group support section 2. The control unit C controls the moving body 1, the container group support section 2, and the lifting device 3 in addition to the transfer device 4 and the overturning prevention device 13.

The container group support section 2, the lifting device 3, the transfer device 4, and the overturning prevention device 13 are provided on the moving body 1. When a direction where the moving body 1 travels is defined as a "vehicle-body front-rear direction L," the container group support section 2 and the transfer device 4 are arranged, on the moving body 1, in parallel in the vehicle-body front-rear direction L. Note that, in the following description, a direction perpendicular to the vehicle-body front-rear direction L in a top-bottom view is defined as a "vehicle-body width direction W."

Figure 6:
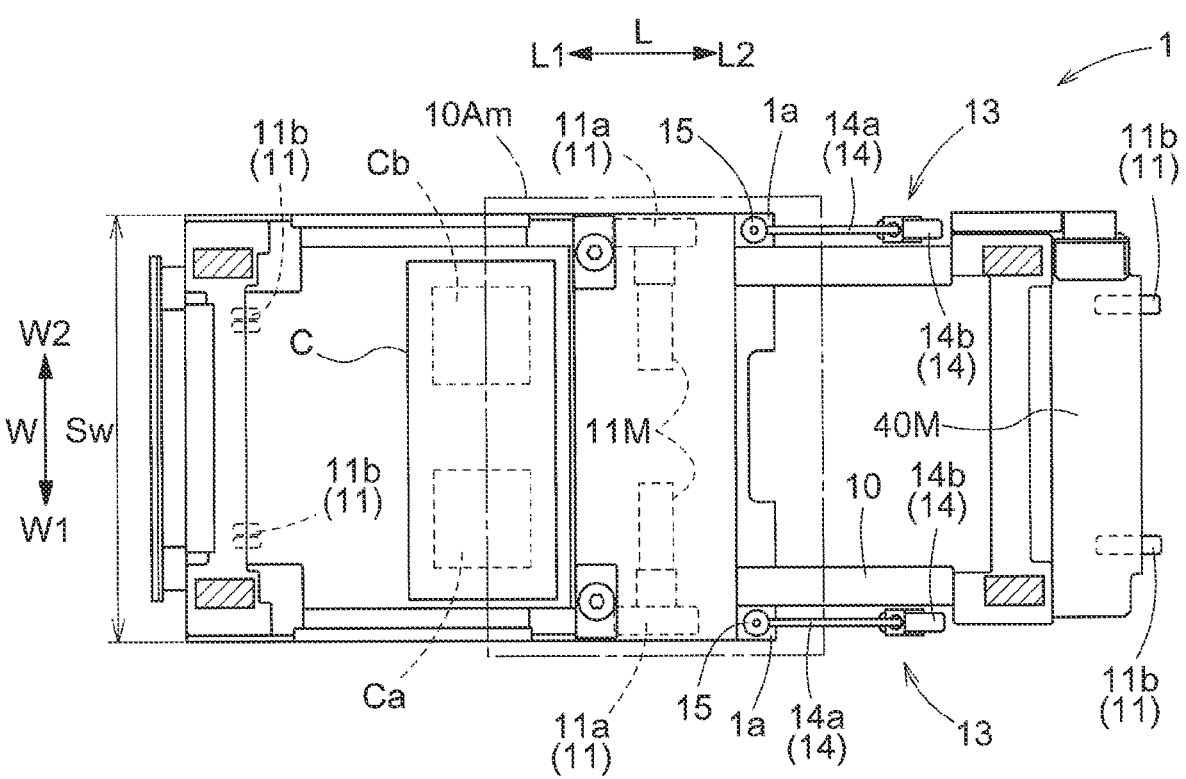
FIG. 6 is an explanatory view illustrating the structure of the moving body.

As illustrated in FIGS. 4 and 6, when the dimension of the moving body 1 in the vehicle-body front-rear direction L is defined as a length dimension Sl, the dimension of the moving body 1 in the vehicle-body width direction W is defined as a width dimension Sw, and the height from the bottom end of the moving body 1 to the upper ends of paired transferring masts 40 (first masts) (described later) is defined as a height dimension Sh, the transport vehicle 100 is configured such that the length dimension Sl and the height dimension Sh are larger than the width dimension Sw.

The control unit C controls each functional section in the transport vehicle 100. In this example, the control unit C controls the moving body 1, the container group support section 2, the lifting device 3, the transfer device 4, the overturning prevention device 13, and a turning gear 5 (described later). The operation to transport and transfer the container 70 is implemented by the control unit C controlling each functional section. The control unit C includes a processor such as a microcomputer, a peripheral circuit such as a memory, and so on, for example. When such hardware collaborates with a program executed on a processor of a computer or the like, each function is implemented.

[Moving Body]

The moving body 1 is configured to travel along the predetermined travel path R (see FIG. 1) and is configured to be able to travel in the inter-shelf region IA, the end region EA, and the outside region OA (see FIG. 2). In the present embodiment, the moving body 1 is configured to travel along the shelf inside path Ra, the end path Rc, and the shelf outside path Rb. The moving body 1 is positioned in the inter-shelf region IA in a state where the moving body 1 is traveling or stopping in the shelf inside path Ra, the moving body 1 is positioned in the end region EA in a state where the moving body 1 is traveling or stopping in the end path Rc, and the moving body 1 is positioned in the outside region OA in a state where the moving body 1 is traveling or stopping in the shelf outside path Rb. In a state where the moving body 1 is present in a boundary between the in inter-shelf region IA or the end region EA and the outside region OA, part of the moving body 1 is positioned in the inter-shelf region IA or the end region EA, and the other part of the moving body 1 is positioned in the outside region OA. In the present embodiment, the moving body 1 is configured to travel on the floor face.

Figure 5:
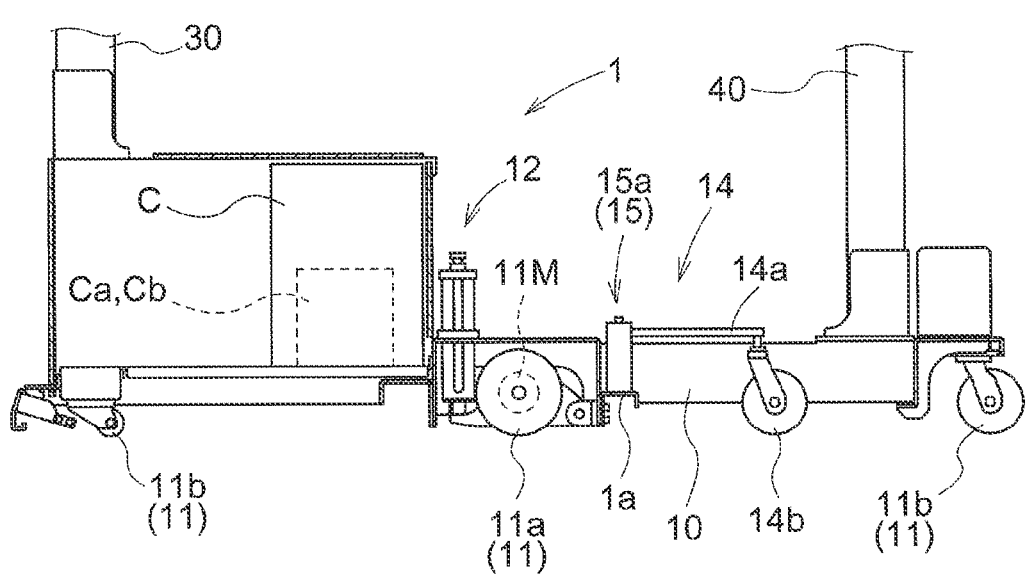
FIG. 5 is an explanatory view illustrating the structure of the moving body.

As illustrated in FIG. 5, the moving body 1 includes a moving main body 10, a plurality of moving wheels 11 connected to the moving main body 10, and a wheel drive source 11M configured to drive at least one of the plurality of moving wheels 11. The wheel drive source 11M includes a motor (not illustrated). When the wheel drive source 11M drives the moving wheels 11, thrust is given to the moving body 1.

In the present embodiment, the plurality of moving wheels 11 includes a driving wheel 11*a* and a driven wheel 11*b*. The driving wheel 11*a* is driven by the wheel drive source 11M. The driven wheel 11*b* rotates along with movement or posture changing of the moving main body 10. That is, the moving body 1 includes the driving wheel 11*a*, the wheel drive source 11M configured to rotationally drive the driving wheel 11*a*, and the driven wheel 11*b*.

As illustrated in FIGS. 5 and 6, in the present embodiment, paired driving wheels 11*a* are disposed to be distanced from each other in the vehicle-body width direction W in an intermediate region 10Am of the moving main body 10 in the vehicle-body front-rear direction L. The intermediate region 10Am is a region disposed in the center in the vehicle-body front-rear direction L among regions formed in respective ranges obtained by dividing the dimension (the length dimension) of the moving main body 10 in the vehicle-body front-rear direction L into thirds. In this example, paired wheel drive sources 11M are disposed in the intermediate region 10Am of the moving main body 10.

In the present embodiment, paired driving wheels 11*a* are rotatably supported by the moving main body 10 such that their respective rotating shafts are along the vehicle-body width direction W. That is, in this example, two driving wheels 11*a* are supported by the moving main body 10. Respective rotating shafts of the paired driving wheels 11*a* are supported by the moving main body 10 in a state where the respective rotating shafts have elasticity in the up-down direction via a suspension mechanism 12. That is, the positions of the rotating shafts of the paired driving wheels 11*a* can change in the up-down direction. The paired driving wheels 11*a* are driven by different wheel drive sources 11M, respectively.

The driven wheel 11*b* is provided on either side of each of the paired driving wheels 11*a* in the vehicle-body front-rear direction L. That is, in this example, four driven wheels 11*b* are supported by the moving main body 10. The driven wheels 11*b* are supported by the moving main body 10 rotatably around their respective axial centers along the up-down direction. That is, a direction along which the rotating shaft of the driven wheel 11*b* extends can be changed within a horizontal surface. The rotating shaft of each of the driven wheels 11*b* is supported in a state where its relative position to the moving main body 10 in the up-down direction is fixed. In this example, each of the driven wheels 11*b* is configured as a caster.

That is, in the present embodiment, the length dimension Sl is a length dimension of the moving main body 10 in the vehicle-body front-rear direction (see FIG. 4), and the width dimension Sw is a dimension of the moving main body 10 in the vehicle-body width direction (see FIG. 6).

With such a configuration, the moving body 1 is rotatable around the axial center along the up-down direction on the spot. More specifically, when the paired driving wheels 11*a* are rotationally driven in directions reverse to each other, the moving body 1 rotates around the axial center along the up-down direction on the spot. Hereby, the moving body 1 can change its advancing direction in a relatively small region. In the present embodiment, the moving body 1 is configured to change the advancing direction in the direction change region DA (see FIG. 2). Note that the advancing direction of the moving body 1 may be changed such that the rotation of either one of the paired driving wheels 11*a* is stopped while the other one of them is rotated, or alternatively, the advancing direction of the moving body 1 may be changed such that the paired driving wheels 11*a* are rotated in the same direction while their rotation speeds are made different.

[Container Group Support Section]

As illustrated in FIG. 4, the container group support section 2 is provided in the moving body 1. The container group support section 2 can support a plurality of containers 70 as a container group 7 in a stacking state. Above the container group support section 2, a stacking region 2A where the container group 7 is disposed is defined. The stacking region 2A is a three-dimensional virtual region extending upward from the container group support section 2. In this example, the container group support section 2 is configured as a conveyer that can move the container group 7 in a state where the container group 7 is put on the container group support section 2. In this example, the container group support section 2 can move the container group 7 along the vehicle-body width direction W. The conveyer constituting the container group support section 2 may be a well-known conveyer such as a roller conveyer, a chain conveyer, or a belt conveyer.

The container group 7 in which the plurality of containers 70 is stacked is carried into the carrying in-out section 9 (see FIGS. 1 and 2). In a state where the moving body 1 is adjacent to the carrying in-out section 9, the container group support section 2 receives the container group 7 from the carrying in-out section 9 or delivers the container group 7 to the carrying in-out section 9. That is, the container group support section 2 is configured to receive or deliver the container group 7 from or to the carrying in-out section 9. Although details are not illustrated herein, in this example, the carrying in-out section 9 is adjacent to a picking area where an operation to take out the to-be-stored object such as a product from the container 70 is performed. When the container group 7 is delivered from the container group support section 2 to the carrying in-out section 9, the to-be-stored object is taken out from the container 70 in the picking area adjacent to the carrying in-out section 9. After part of or all to-be-stored objects stored in the container 70 are taken out, the container 70 is delivered to the container group support section 2 (the transport vehicle 100) from the carrying in-out section 9 and is transported to the container shelf 8 again. However, the carrying in-out section 9 may not be adjacent to the picking area and may be adjacent to other facilities or work areas. Further, for example, the carrying in-out section 9 may be configured to transport the container group 7 delivered from the container group support section 2 to outside the transport facility F.

[Lifting Device]

The lifting device 3 is provided in the moving body 1. The lifting device 3 is configured to lift the containers 70 in the container group 7 supported by the container group support section 2, in other words, the containers 70 in the container group 7 disposed in the stacking region 2A.

As illustrated in FIG. 4, the lifting device 3 includes a lifting mast 30 provided to stand upward from the moving body 1, a lifting raising-lowering body 30B connected to the lifting mast 30, and a lifting raising-lowering-body driving section 30M configured to raise and lower the lifting raising-lowering body 30B along the lifting mast 30. Although details are not illustrated herein, the lifting raising-lowering-body driving section 30M includes, for example, an endless body such as a belt connected to the lifting raising-lowering body 30B, a rotating body on which the endless body is wound, and a motor configured to rotationally drive the rotating body.

Here, the lifting mast 30 is a mast uninvolved in transferring of the container 70. In other words, the lifting mast 30 is a mast provided with no transfer means such as a transfer machine B (described later). In order to distinguish the lifting mast 30 from a transferring mast 40 (described later), the transferring mast 40 can be referred to as a "first mast," and a mast (the lifting mast 30 in this example) uninvolved in transferring of the container 70 can be referred to as a "second mast." That is, in this example, the first mast and the second mast are fixed to the moving body 1, and the first mast and the second mast are disposed to be distanced from each other in the vehicle-body front-rear direction L.

Figure 9:
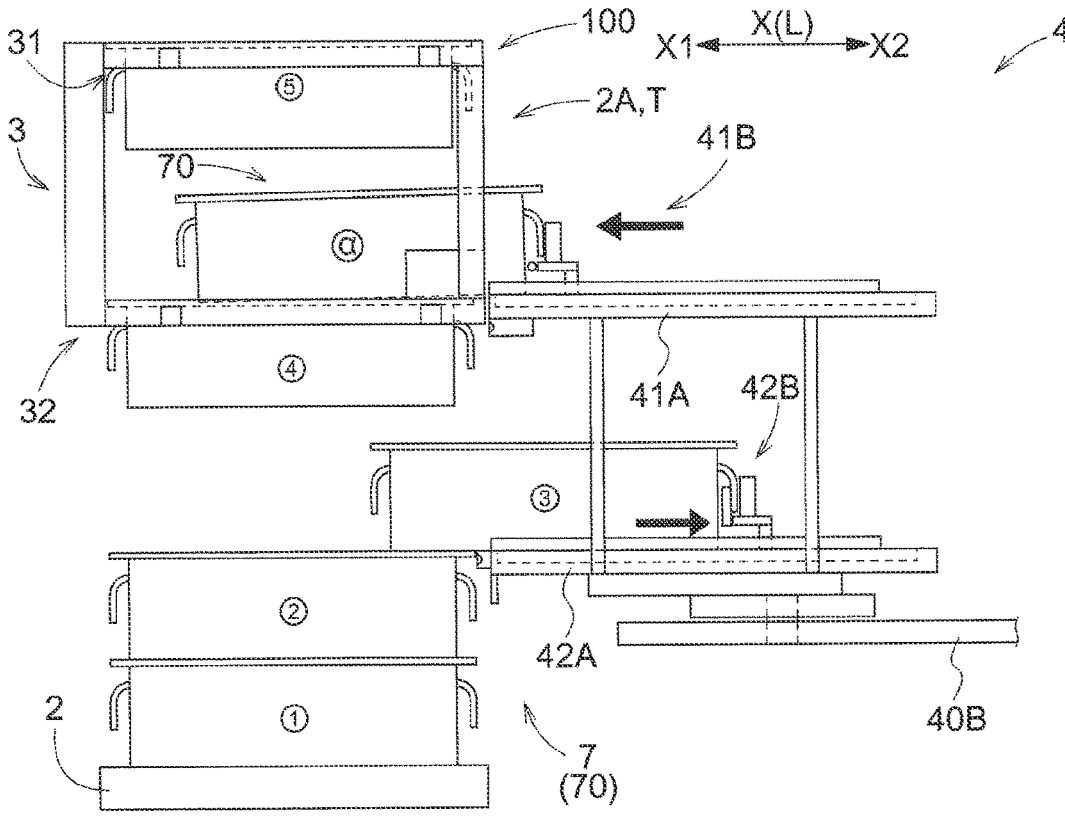
FIG. 9 is an explanatory view in a case where a parallel operation of scooping and unloading of containers is performed in a stacking region.

The lifting device 3 includes a first lifting mechanism 31 configured to lift a first container 70 at a given height within the container group 7 stacked in the stacking region 2A relative to a container 70 disposed below the first container 70 and adjacent thereto, and a second lifting mechanism 32 configured to lift a second container 70 positioned below the first container 70 lifted by the first lifting mechanism 31, relative to a container 70 disposed below the second container 70 and adjacent thereto. Further, in the present embodiment, the first lifting mechanism 31 and the second lifting mechanism 32 are disposed to be distanced from each other in the up-down direction. Hereby, as illustrated in FIG. 9, for example, a space can be formed, in the up-down direction, between the first container 70 lifted by the first lifting mechanism 31 and the second container 70 lifted by the second lifting mechanism 32. Further, a space can be also formed, in the up-down direction, below the second container 70 lifted by the second lifting mechanism 32.

In a case where a space is formed, in the up-down direction, between the first container 70 lifted by the first lifting mechanism 31 and the second container 70 lifted by the second lifting mechanism 32, another container 70 can be put down in the space. That is, another container 70 can be stacked, by the transfer device 4, on the second container 70 lifted by the second lifting mechanism 32. FIG. 9 illustrates an example in which a container 70 (a container with a reference sign "α" in FIG. 9) held by the transfer device 4 is put down in the space formed, in the up-down direction, between the first container 70 (a container with a reference sign "5" in FIG. 9) lifted by the first lifting mechanism 31 and the second container 70 (a container with a reference sign "4" in FIG. 9) lifted by the second lifting mechanism 32.

Further, in a case where a space is formed, in the up-down direction, below the second container 70 lifted by the second lifting mechanism 32, the container 70 disposed below the second container 70 lifted by the second lifting mechanism 32 can be scooped by use of the space. FIG. 9 illustrates an example in which a container 70 (a container with a reference sign "3" in FIG. 9) disposed below the second container 70 (the container with the reference sign "4" in FIG. 9) lifted by the second lifting mechanism 32 is scooped. Note that the unloading operation and the scooping operation of the container 70 in the stacking region 2A will be described later.

[Transfer Device]

As illustrated in FIG. 4, the transfer device 4 is provided in the moving body 1. The transfer device 4 is configured to transfer the container 70 to a transfer target spot T. The transfer device 4 is configured to perform the unloading operation to transfer the container 70 to the transfer target spot T and the scooping operation to transfer the container 70 from the transfer target spot T. Note that, in the present specification, to transfer the container 70 from the transfer target spot T to the transfer device 4 is referred to "scooping," but the "scooping" is not limited to a specific transfer operation. In the present embodiment, the transfer target spot T includes the stacking region 2A and the shelf section 80 of the container shelf 8.

Here, the moving direction of the container 70 to be transferred by the transfer device 4 is referred to as a "transfer direction X." Further, one side in the transfer direction X is referred to as a "transfer-direction unloading side X1," and the other side is referred to as a "transfer-direction scooping side X2." In this example, the transfer direction X is a direction along the horizontal direction. The transfer-direction unloading side X1 is a side to which the container 70 moves along the transfer direction X in a case where the container 70 is unloaded. The transfer-direction scooping side X2 is a side to which the container 70 moves along the transfer direction X in a case where the container 70 is scooped.

Figure 7:
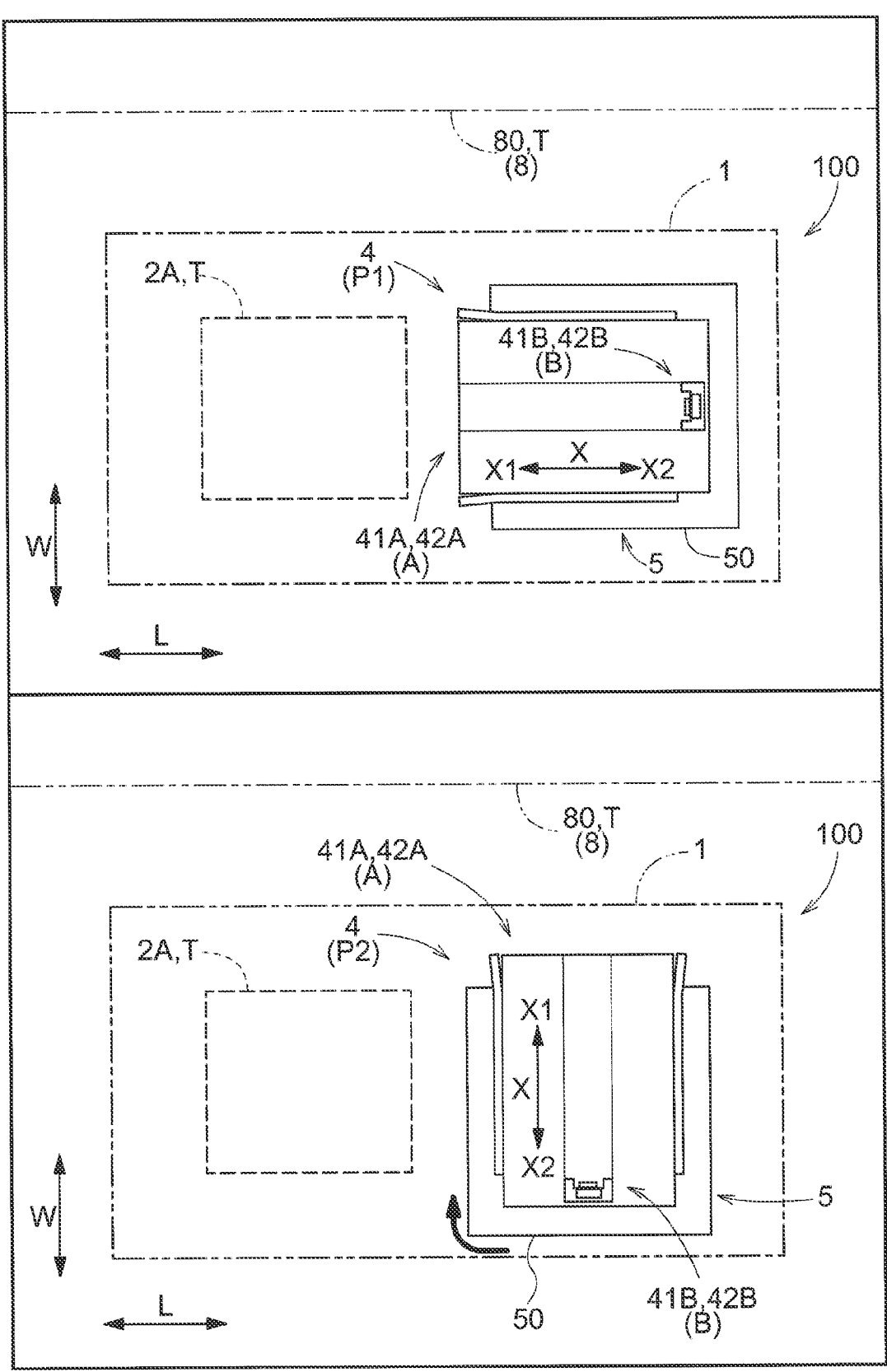
FIG. 7 is a plan view illustrating a first posture and a second posture of a transfer device.

In the present embodiment, the transport vehicle 100 includes the turning gear 5 configured to turn the transfer device 4 around its axial center along the up-down direction. As illustrated in FIG. 7, the turning gear 5 is configured to turn the transfer device 4 around the axial center along the up-down direction to change the orientation of the transfer device 4 between a first posture P1 in which the transfer-direction unloading side X1 is directed toward the stacking region 2A and a second posture P2 in which the transfer-direction unloading side X1 is directed toward the container shelf 8. As such, in the present embodiment, the transfer direction X can be changed in the horizontal surface by the turning gear 5.

In the present embodiment, the transfer device 4 changes its posture in accordance with the position of the transfer target spot T. More specifically, the transfer device 4 takes the first posture P1 when the transfer target spot T is the stacking region 2A, and the transfer device 4 takes the second posture P2 when the transfer target spot T is the container shelf 8 (the shelf section 80). As illustrated in FIG. 4, in this example, the turning gear 5 includes a turning base 50 configured to support the transfer device 4, a turning shaft 51 configured to support the turning base 50 turnably relative to the transferring raising-lowering body 40B, and a turning driving section (not illustrated) configured to drive the turning shaft 51.

As illustrated in FIG. 4, the transfer device 4 includes the transferring mast 40 fixed to the moving body 1 and disposed along the up-down direction, the transferring raising-lowering body 40B configured to be raised and lowered along the transferring mast 40, a holding section A connected to the transferring raising-lowering body 40B and configured to hold the container 70, and the transfer machine B configured to transfer the container 70. Further, the transfer device 4 includes a transferring-raising-lowering-body driving section 40M configured to raise and lower the transferring raising-lowering body 40B along the transferring mast 40. Hereby, the transfer device 4 can move the holding section A and the transfer machine B in the up-down direction and transfer the container 70 to each of the shelf sections 80 (see FIG. 3) provided in multiple levels. In this example, in a case where the moving body 1 is present in the inter-shelf region IA and the end region EA (see FIG. 2), the control unit C controlling the transfer device 4 is configured to execute a raising-lowering control such that the transferring raising-lowering body 40B is raised and lowered to transfer the container 70 relative to the container shelf 8. Note that, in the present embodiment, the transferring mast 40 corresponds to a "mast," and the transferring raising-lowering body 40B corresponds to a "raising-lowering body."

Figure 11:
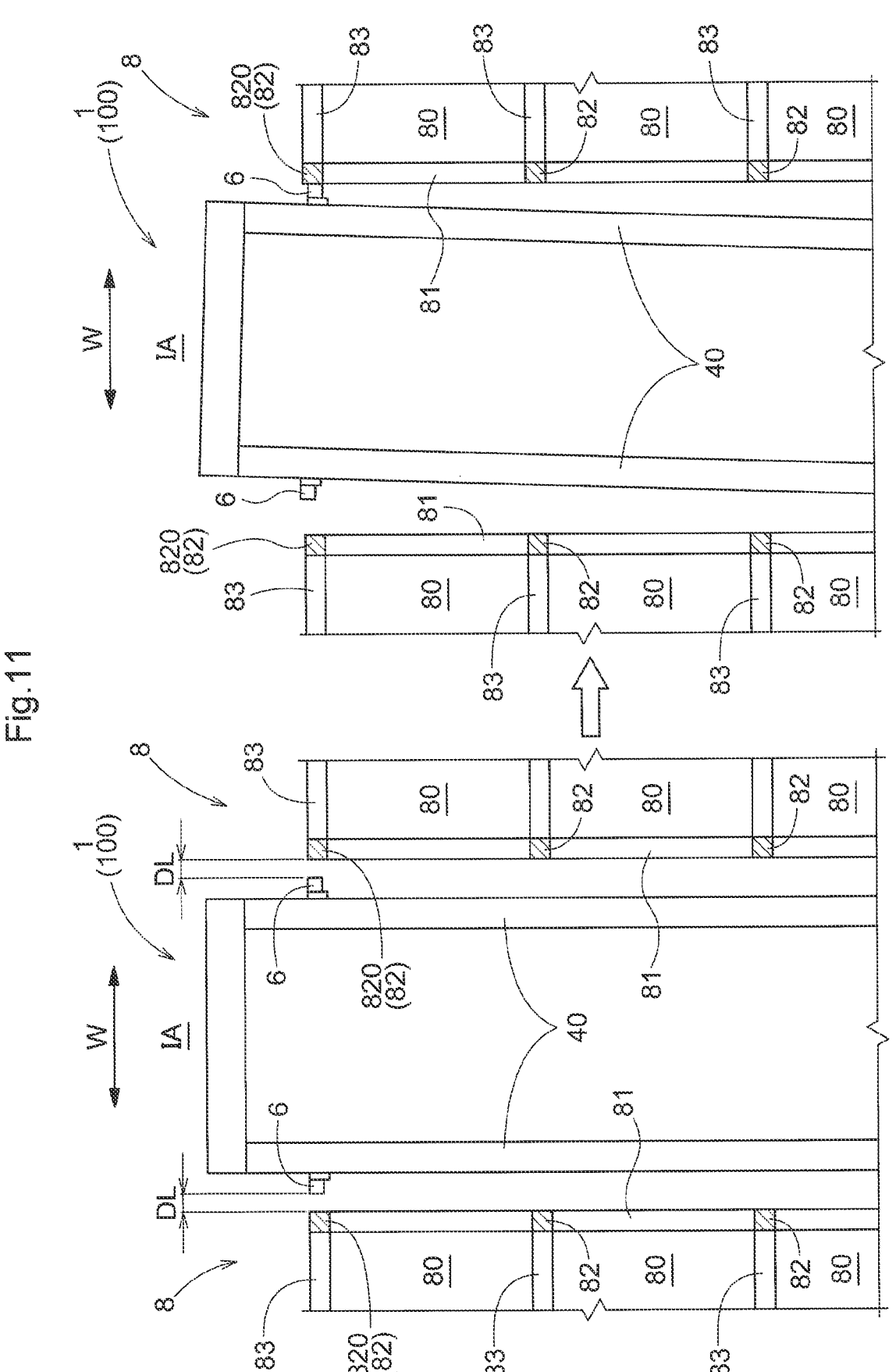
FIG. 11 is an explanatory view illustrating a structure for supporting an inclined transport vehicle by the container shelf.

In the present embodiment, paired transferring masts 40 are distanced from each other in the vehicle-body width direction W and fixed to the moving body 1 (also see FIG. 11). The transferring raising-lowering body 40B is supported elevatably relative to the paired transferring masts 40. As described above, the transferring mast 40 can be referred to as the "first mast." A mast (the lifting mast 30 provided in the lifting device 3 in this example) other than the transferring mast 40 can be referred to as the "second mast."

That is, in the present embodiment, the height dimension is a height from the travel face on which the moving body 1 travels to the upper end of the transferring mast 40 (see FIG. 4).

The holding section A is connected to the transferring raising-lowering body 40B and configured to hold the container 70. In the present embodiment, the holding section A includes a first holding section 41A, and a second holding section 42A disposed below the first holding section 41A. The first holding section 41A and the second holding section 42A are each configured to hold the container 70 solely.

In the present embodiment, the transfer device 4 includes a holding connecting section 43 configured to connect the first holding section 41A to the second holding section 42A in the up-down direction. The holding connecting section 43 connects the first holding section 41A to the second holding section 42A such that the distanced therebetween in the up-down direction is uniform.

The transfer machine B is configured to transfer the container 70 to each of the shelf section 80 and the stacking region 2A. In a case where the shelf section 80 is the transfer target spot T, the transfer machine B transfers the container 70 between the holding section A and the shelf section 80. Further, in a case where the stacking region 2A is the transfer target spot T, the transfer machine B transfers the container 70 between the holding section A and the stacking region 2A. In this example, the transfer machine B transfers the container 70 to the stacking region 2A in the first posture P1 and transfers the container 70 to the shelf section 80 in the second posture P2 (see FIG. 7).

As illustrated in FIG. 4, in the present embodiment, the transfer machine B includes a first transfer machine 41B and a second transfer machine 42B disposed below the first transfer machine 41B. The first transfer machine 41B transfers the container 70 between the first holding section 41A and the transfer target spot T. The second transfer machine 42B transfers the container 70 between the second holding section 42A and the transfer target spot T.

Figure 8:
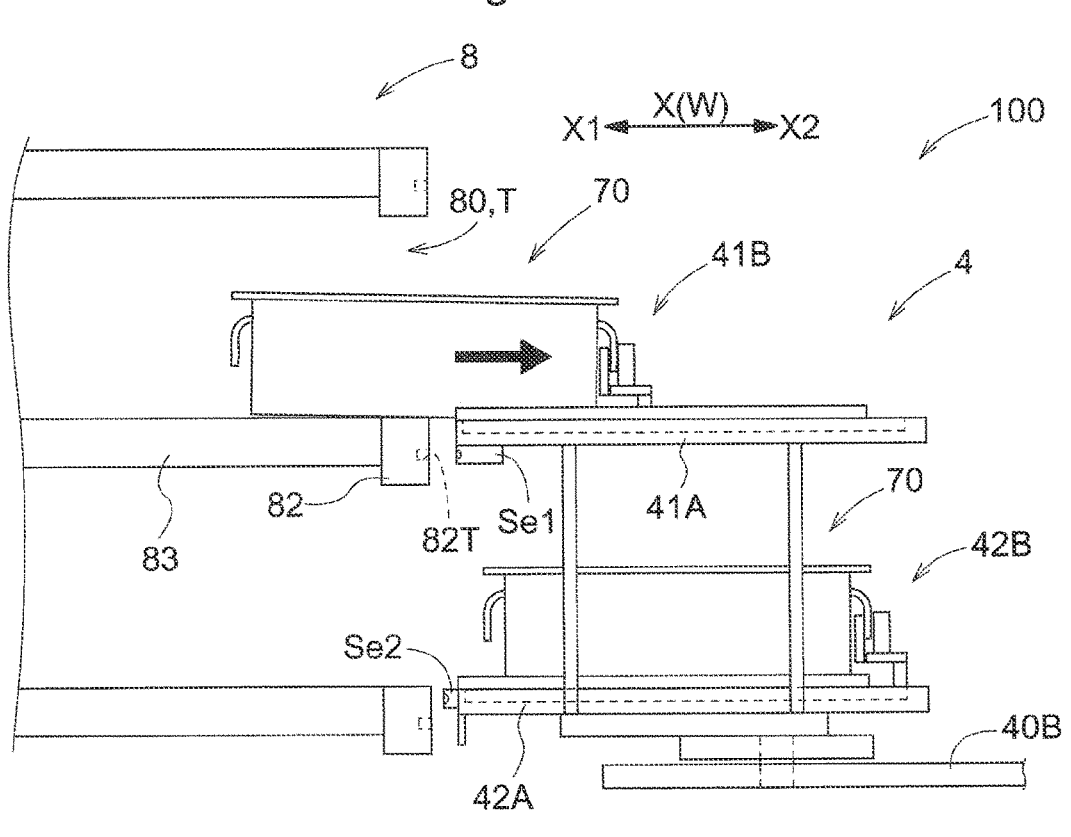
FIG. 8 is an explanatory view illustrating a scooping operation of a container to a shelf section.

FIG. 8 illustrates the scooping operation (a transfer operation) of the container 70 relative to the shelf section 80 and illustrates a case where the container 70 stored in the shelf section 80 is scooped by the first transfer machine 41B to the first holding section 41A. In this case, the control unit C (see FIG. 4) adjusts the position of the first transfer machine 41B to the reference position 80P (see FIG. 3) of the shelf section 80 and then draws the container 70 toward the transfer-direction scooping side X2. In the present embodiment, the reference position 80P of the shelf section 80 is detected by a reference position detection sensor Se1 provided in the transfer device 4.

Further, although not illustrated herein, in a case where the unloading operation (a transfer operation) of the container 70 to the shelf section 80 is performed, when the control unit C (see FIG. 4) determines that no container 70 is stored in a target shelf section 80 to which the container 70 is to be unloaded, the container 70 is pressed toward the transfer-direction unloading side X1. Note that, in the present embodiment, the container 70 stored in the shelf section 80 is detected by a storage container detection sensor Se2 provided in the transfer device 4.

Further, as described above, in the present embodiment, the lifting device 3 can form a space, in the up-down direction, between the plurality of containers 70 stacked in the stacking region 2A. The transfer device 4 transfers the container 70 relative to the stacking region 2A by use of the space. In the present embodiment, the transfer device 4 is configured to perform the scooping operation and the unloading operation of the container 70 relative to the stacking region 2A. More specifically, the transfer device 4 is configured to perform a parallel operation to perform scooping of the container 70 and unloading of the container 70 concurrently with respect to the stacking region 2A (see FIG. 9).

FIG. 9 illustrates an example in which the parallel operation is performed in a case where five containers 70 are stacked at five stages as the container group 7 in the stacking region 2A. In this example, by use of a space formed in the up-down direction, by the lifting device 3, between a container 70 at a fifth stage (the container with the reference sign "5" in FIG. 9) and a container 70 at a fourth stage (the container with the reference sign "4" in FIG. 9), the container 70 (the container with the reference sign "α" in FIG. 9) targeted for unloading is pressed toward the transfer-direction unloading side X1 by the first transfer machine 41B onto the container 70 (the container "4") at the fourth stage, and the container (the container "α") targeted for unloading is unloaded. Further, concurrently, by use of a space formed by the lifting device 3 below the container 70 (the container "4") at the fourth stage, a container 70 at a third stage (the container with the reference sign "3" in FIG. 9) is drawn toward the transfer-direction scooping side X2 by the second transfer machine 42B, and the container 70 (the container "3") is scooped. That is, in this example, one container 70 (the container "3") from among the plurality of containers 70 disposed in the stacking region 2A is replaced with a new container 70 (the container "α").

[Overturning Prevention Device]

As illustrated in FIGS. 4, 5, and 6, the overturning prevention device 13 is provided in the moving body 1. The overturning prevention device 13 is configured to prevent the transport vehicle 100 from overturning.

The overturning prevention device 13 includes a support arm 14 supported by the moving body 1, an arm driving device 15 configured to drive the support arm 14, and a shaking occurrence information acquisition section Cb (see FIG. 4) configured to acquire shaking occurrence information indicating that shaking on the travel face where the moving body 1 travels is equal to or more than a predetermined reference value.

The support arm 14 includes an arm main body 14a, and a support wheel 14b supported by the arm main body 14a and disposed to be grounded on the travel face. Further, the support arm 14 is disposed near the driving wheel 11a disposed in the intermediate region 10Am of the moving main body 10. That is, the support arm 14 is disposed at a position closer to the driving wheel 11a than the driven wheel 11b in the vehicle-body front-rear direction L. In the present embodiment, paired arm main bodies 14a are supported respectively by the opposite sides of the moving main body 10 in the vehicle-body width direction W. That is, in the present embodiment, the moving body 1 includes the support arms 14 on the opposite sides in the vehicle-body width direction W.

Each arm main body 14*a* is supported by the moving main body 10 swingably around its axial center along the up-down direction. That is, each support arm 14 is supported by the moving body 1 swingably around its axial center along the up-down direction. As illustrated in FIGS. 5, 6, in the present embodiment, each arm main body 14*a* is an elongated member, and one end side of the each arm main body 14*a* is pivotally supported by an arm attachment section 1*a* extending horizontally from a side face of the moving main body 10. Each arm main body 14*a* is swingable around the rotation axis on the one end side.

The support wheel 14*b* is provided on the other side of the arm main body 14*a*. The support wheel 14*b* is supported by the arm main body 14*a* rotatably around its axial center along the up-down direction. That is, a direction along which the rotating shaft of the support wheel 14*b* extends can be changed within a horizontal surface. In this example, the support wheel 14*b* is configured as a caster.

Figure 10:
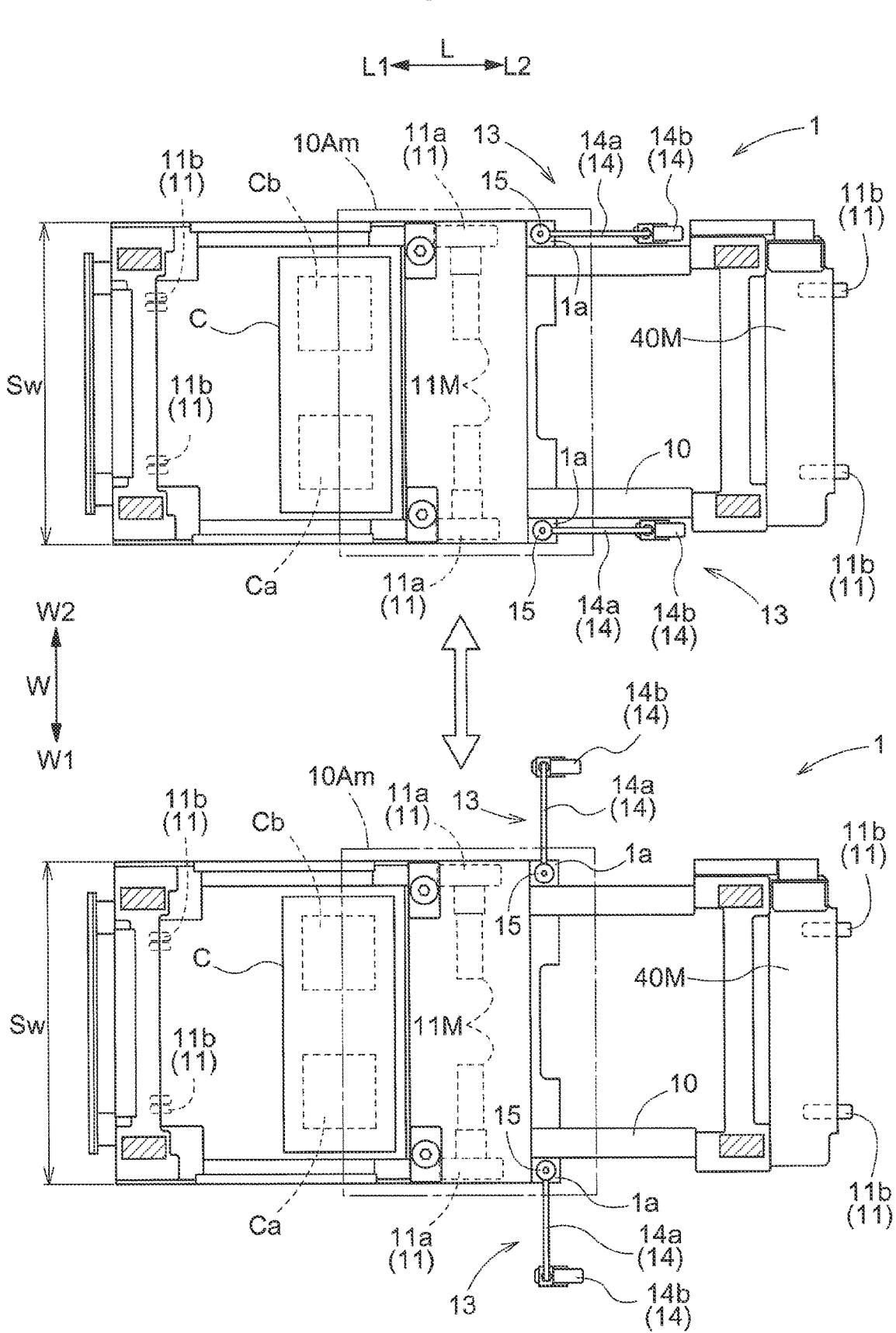
FIG. 10 is a plan view illustrating a projecting state and a retracted state of a support arm.

The support arm 14 is configured to be changeable between a projecting state where the support arm 14 projects outwardly in the vehicle-body width direction W from the moving body 1 to be grounded on the travel face outside the moving body 1 in the vehicle-body width direction W and a retracted state where the support arm 14 is retracted inside the width dimension Sw of the moving body 1. As illustrated in FIG. 10, in the present embodiment, a state where each arm main body 14*a* swings around the rotation axis on the one end side to be separated from the side face of the moving main body 10 such that the longitudinal direction of the each arm main body 14*a* is along the vehicle-body width direction W is the projecting state. In the meantime, a state where each arm main body 14*a* is close to the side face of the moving main body 10 such that the longitudinal direction of the each arm main body 14*a* is along the vehicle-body front-rear direction L is the retracted state. Note that, in this example, in a state where the support wheel 14*b* is grounded on the travel face, the support arm 14 can be changed between the projecting state and the retracted state.

In the present embodiment, the arm driving device 15 includes a rotating body as a power transmission mechanism provided on one end side of the arm main body 14*a*, a motor 15*a* as a drive source configured to rotationally drive the rotating body, and so on. Further, the driving of the motor 15*a* is controlled by the control unit C.

In a case where the shaking occurrence information acquisition section Cb acquires shaking occurrence information, the arm driving device 15 executes an arm projecting operation to change the support arm 14 from the retracted state to the projecting state. In the present embodiment, in a case where the shaking occurrence information acquisition section Cb acquires shaking occurrence information, the control unit C controls driving of the motor 15*a* to execute the arm projecting operation on the support arm 14. In this example, the shaking occurrence information acquisition section Cb is configured to acquire shaking occurrence information transmitted from the host controller H. In this case, the host controller H is configured to receive information related to occurrence of shaking such as occurrence of an earthquake from outside, and the host controller H transmits shaking occurrence information to the shaking occurrence information acquisition section Cb based on the information thus received. Further, in a state where the shaking occurrence information acquisition section Cb acquires no shaking occurrence information, the arm driving device 15 maintains the support arm 14 in the retracted state. In other words, in a state where the shaking occurrence information acquisition section Cb acquires no shaking occurrence information, the arm driving device 15 does not execute the arm projecting operation.

Further, in a state where the moving body 1 is in the inter-shelf region IA, in other words, in a state where the moving body 1 is traveling or stopping in the shelf inside path Ra (see FIG. 1), the arm driving device 15 is configured not to perform the arm projecting operation. That is, in a case where the moving body 1 is in the inter-shelf region IA, the arm driving device 15 prohibits execution of the arm projecting operation in the inter-shelf region IA. Conversely, in a case where the moving body 1 is in the end region EA or the outside region OA, the arm driving device 15 permits execution of the arm projecting operation.

In the present embodiment, in a case where the moving body 1 is in the end region EA or the outside region OA, when the shaking occurrence information acquisition section Cb acquires shaking occurrence information, driving of the motor 15*a* is controlled such that the arm projecting operation is executed to change the support arm 14 from the retracted state to the projecting state (see FIG. 10).

In the present embodiment, the transport vehicle 100 includes a position information acquisition section Ca (see FIG. 4) configured to acquire current position information on the moving body 1. In this example, the control unit C determines whether the moving body 1 is in the inter-shelf region IA, in the end region EA, or in the outside region OA, based on the position information acquired by the position information acquisition section Ca. In this example, the position information acquisition section Ca is configured to acquire current position information on the moving body 1, transmitted from the host controller H managing the whole facility. In this case, the host controller H grasps positions of moving bodies 1 (transport vehicles 100) present in the whole facility and transmits current position information on the moving bodies 1 (transport vehicles 100) to the position information acquisition section Ca.

Here, in recent years, earthquake measures have been taken in various fields. The transport vehicle 100 according to this disclosure is configured to be hard to overturn even in a case where strong shaking occurs at the time when an earthquake or the like occurs. In the present embodiment, three overturning prevention measures are taken so that the transport vehicle 100 is hard to overturn even in a case where the moving body 1 (the transport vehicle 100) is present in any of the inter-shelf region IA, the end region EA, and the outside region OA (see FIG. 2). A detailed description thereof is given below.

[First Overturning Prevention Measure]

First described is a first overturning prevention measure. In the present embodiment, in a case where strong shaking occurs at the time when an earthquake or the like occurs and shaking of the travel face where the moving body 1 travels reaches a predetermined reference value or more, shaking occurrence information is transmitted from the host controller H to the shaking occurrence information acquisition section Cb of the control unit C.

When the shaking occurrence information acquisition section Cb acquires the shaking occurrence information, the control unit C determines where the moving body 1 is present, in the inter-shelf region IA, in the end region EA, or in the outside region OA, in other words, whether the moving body 1 is traveling or stopping in which one of the shelf inside path Ra, the end path Rc, and the shelf outside path Rb, based on the position information acquired by the position information acquisition section Ca.

In a case where the control unit C determines that the moving body 1 is present in the outside region OA, the control unit C controls driving of the motor 15*a* such that the paired support arms 14 are changed from the retracted state into the projecting state (see FIG. 10). That is, in a case where the moving body 1 is present in the outside region OA, the arm projecting operation is executed on both of the paired support arms 14.

Hereby, the support wheels 14*b* of the paired support arms 14 are grounded on the travel face outside the moving body 1 in the vehicle-body width direction W. This accordingly makes it possible to restrict the transport vehicle 100 from greatly inclining toward either side in the vehicle-body width direction W, thereby making it possible to prevent the transport vehicle 100 from overturning.

In a case where the control unit C determines that the moving body 1 is present in the end region EA, the control unit C controls driving of the motor 15*a* to change only the support arm 14 provided on a side facing the front surface of the container shelf 8, out of the paired support arms 14, from the retracted state into the projecting state. In other words, in a case where the moving body 1 is present in the end region EA, the arm projecting operation is executed only on one of the paired support arms 14.

Hereby, the support wheel 14*b* of the one of the paired support arms 14 is grounded on the travel face outside the moving body 1 in the vehicle-body width direction W. Accordingly, it is possible to restrict the transport vehicle 100 from greatly inclining on a side opposite from the side facing the front surface of the container shelf 8, in the vehicle-body width direction W. Further, it is possible to restrict the transport vehicle 100 from inclining to the side facing the front surface of the container shelf 8 in the vehicle-body width direction W by the container shelf 8, as will be described below.

In a case where the control unit C determines that the moving body 1 is present in the inter-shelf region IA, the execution of the arm projecting operation on both of the paired support arms 14 is prohibited. In this case, as will be described later, the container shelf 8 can restrict the transport vehicle 100 from inclining in the vehicle-body width direction W, and therefore, even when the arm projecting operation is not executed in the inter-shelf region IA, it is possible to prevent the transport vehicle 100 from overturning. Note that, in this example, in a case where the execution of the arm projecting operation is prohibited, at the timing when the travel position of the transport vehicle 100 is changed from the inter-shelf region IA to the outside region OA, the control unit C executes the arm projecting operation on both of the paired support arms 14, so that the paired support arms 14 are changed from the retracted state into the projecting state As described above, by taking the first overturning prevention measure, the transport vehicle 100 in the end region EA or the outside region OA can be made hard to overturn. [Second Overturning Prevention Measure]

Next will be described a second overturning prevention measure. As illustrated in FIG. 11, in the present embodiment, the container shelf 8 includes a target beam member 820 extending horizontally along the front surface of the container shelf 8. The target beam member 820 is provided in each container shelf 8. The target beam member 820 is any of a plurality of beam members 82 in each container shelf 8. In this example, the target beam member 820 is a beam member 82 disposed on the uppermost side among the plurality of beam members 82.

In the present embodiment, a guided member 6 projecting outwardly in the vehicle-body width direction W from the transferring mast 40 is fixed to a position of the transferring mast 40 at a height corresponding to the target beam member 820. In a case where the transport vehicle 100 in the inter-shelf region IA inclines toward the vehicle-body width direction W, the guided member 6 is disposed at a position where the guided member 6 abuts with the target beam member 820.

Here, the guided member 6 is disposed at a height equal to or more than the height where the target beam member 820 is provided. In the present embodiment, the arrangement height at which the guided member 6 is disposed is set in accordance with a separated distance DL between the guided member 6 and the target beam member 820 in the vehicle-body width direction W in a state where the moving body 1 is in the inter-shelf region IA, in other words, in a state where the moving body 1 is traveling or stopping in the shelf inside path Ra (see FIG. 1). In this example, the separated distance DL is basically within a given range even in a case where the moving body 1 is present at any position in the inter-shelf region IA. In other words, the shelf inside path Ra (the travel path R) is set such that the separated distance DL has a value within a given range even in a case where the moving body 1 is present at any position in the inter-shelf region IA.

As illustrated in the right view in FIG. 11, the position of the guided member 6 is lowered as the transport vehicle 100 inclines toward the vehicle-body width direction W. As the separated distance DL becomes longer, the inclination of the transport vehicle 100 increases, and the position of the guided member 6 is lowered. Accordingly, it is preferable that, as the separated distance DL becomes longer, the guided member 6 be disposed at a position higher than the height at which the target beam member 820 is provided, and as the separated distance DL becomes shorter, the guided member 6 be disposed to come closer to the height at which the target beam member 820 is provided. Hereby, in a case where the transport vehicle 100 in the inter-shelf region IA inclines toward the vehicle-body width direction W, the guided member 6 can be brought into contact with the target beam member 820 appropriately. With the above configuration, the transport vehicle 100 can be supported by the target beam member 820 (the container shelf 8), and the transport vehicle 100 in the inter-shelf region IA can be made hard to overturn. Note that, in the description of the present embodiment, the "height of the target beam member 820" is a height from the floor face on the basis of a central position of the target beam member 820 in the up-down direction. Similarly, the "arrangement height of the guided member 6" is a height from the floor face on the basis of a central position of the guided member 6 in the up-down direction.

The projection amount of the guided member 6 from the transferring mast 40 in the vehicle-body width direction W is set to a magnitude with which the guided member 6 first abuts with the target beam member 820 in a case where the transport vehicle 100 in the inter-shelf region IA inclines toward the vehicle-body width direction W. In other words, the projection amount of the guided member 6 in the vehicle-body width direction W is set such that, in a part of the transport vehicle 100 that faces the container shelf 8, a projecting end part (an abutting surface) of the guided member 6 in the vehicle-body width direction W is positioned on a side closest to the container shelf 8 in a state where the transport vehicle 100 inclines toward the vehicle-body width direction W. It is preferable that the projection amount be set in accordance with the height at which the guided member 6 is fixed to the transferring mast 40. That is, a displacement amount of the transferring mast 40 in the vehicle-body width direction W by the inclination of the transport vehicle 100 increases as it goes upward. Accordingly, the projection amount of the guided member 6 in the vehicle-body width direction W can be made smaller as the position at which the guided member 6 is fixed to the transferring mast 40 becomes higher. Conversely, it is necessary to increase the projection amount of the guided member 6 in the vehicle-body width direction W as the position at which the guided member 6 is fixed to the transferring mast 40 becomes lower. Further, for example, in a case where members other than the transferring mast 40 are provided around the guided member 6, it is preferable that the projection amount of the guided member 6 in the vehicle-body width direction W be set to a value at which the projecting end part (the abutting surface) of the guided member 6 in the vehicle-body width direction W is positioned outwardly in the vehicle-body width direction W from the other members. Hereby, in a case where the transport vehicle 100 in the inter-shelf region IA inclines toward the vehicle-body width direction W, the guided member 6 can be first brought into contact with to the target beam member 820.

In the present embodiment, the guided member 6 is provided each of the paired transferring masts 40 to project outwardly in the vehicle-body width direction W. Hereby, even in a case where the transport vehicle 100 inclines toward either side in the vehicle-body width direction W in a state where the moving body 1 is present between paired container shelves 8, the transport vehicle 100 can be supported by either of the paired container shelves 8.

Further, in the present embodiment, the guided member 6 is also provided in each of the paired lifting masts 30 (see FIG. 4) to project outwardly in the vehicle-body width direction W. In other words, in the present embodiment, the guided member 6 is provided in each of the first mast (the transferring mast 40) and the second mast (the lifting mast 30) disposed to be distanced from the first mast in the vehicle-body front-rear direction L. Hereby, in a case where the transport vehicle 100 in the inter-shelf region IA inclines toward the vehicle-body width direction W, the transport vehicle 100 can be supported by the container shelf 8 highly safely.

With the above configuration, the transport vehicle 100 in the inter-shelf region IA can be made hard to overturn.

[Third Overturning Prevention Measure]

Figure 12:
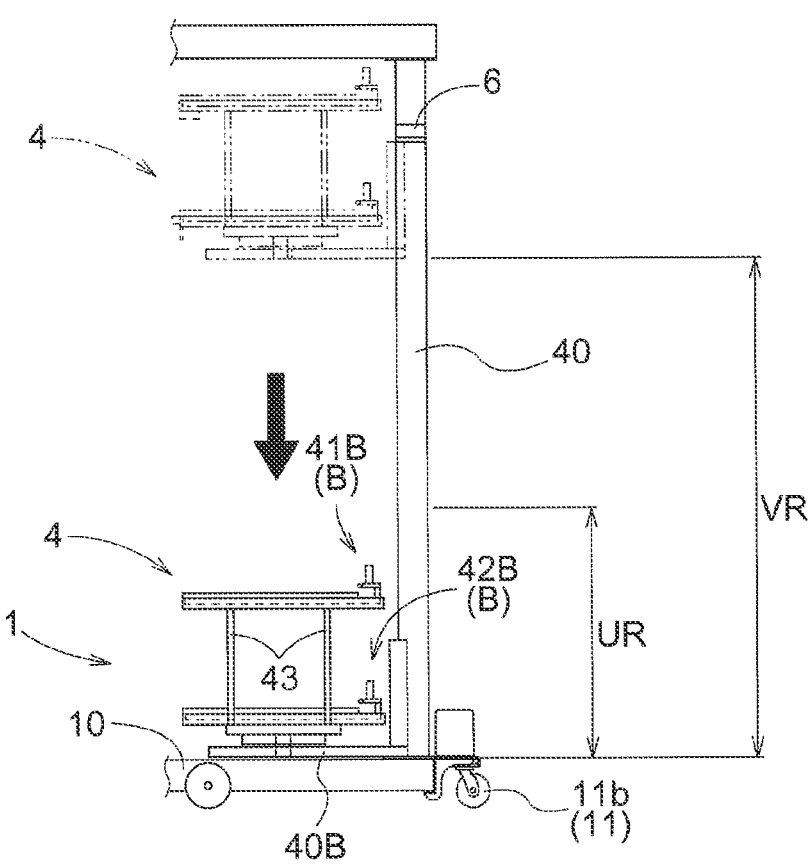
FIG. 12 is an explanatory view illustrating the operation of a raising-lowering body by a gravitational center lowering control.

Next will be described a third overturning prevention measure. As illustrated in FIG. 12, the control unit C (see FIG. 4) is configured to execute a gravitational center lowering control to control the transferring raising-lowering body 40B such that its position is positioned within a lower range UR set below the center of a liftable range VR. The control unit C executes the gravitational center lowering control by controlling the transfer device 4. More specifically, the control unit C controls the transferring-raising-lowering-body driving section 40M (see FIG. 4) and executes the gravitational center lowering control. By the execution of the gravitational center lowering control, the gravitational center of the whole transport vehicle 100 is lowered, so that the transport vehicle 100 can be made hard to overturn. In the present embodiment, in the gravitational center lowering control, the control unit C positions the transferring raising-lowering body 40B in a lowermost part in the liftable range VR. Hereby, the transport vehicle 100 can be further made hard to overturn. Note that, in the present embodiment, the guided member 6 is provided in the transferring mast 40, and the upper limit position of the liftable range VR of the transferring raising-lowering body 40B is set so that the transferring raising-lowering body 40B does not interfere with the guided member 6.

The control unit C determines whether the moving body 1 is present in the inter-shelf region IA or the end region EA or is present in the outside region OA (see FIG. 2), and the control unit C executes the gravitational center lowering control in at least part of the outside region OA. In the outside region OA, there are few structures such as the container shelf 8 that can support the transport vehicle 100 when the moving body 1 is present in the inter-shelf region IA or the end region EA. However, as described above, when the gravitational center lowering control is executed in at least part of the outside region OA, the gravitational center of the whole transport vehicle 100 can be lowered in a case where the transport vehicle 100 is present in the outside region OA. Hereby, the transport vehicle 100 present in the outside region OA can be made hard to overturn. Note that, in a case where the moving body 1 is present in the end region EA, the container shelf 8 is present only on one side of the moving body 1 in the vehicle-body width direction W. Accordingly, in a case where the moving body 1 is present in the end region EA, there is fewer structures that can support the transport vehicle 100 than in a case where the moving body 1 is present in the inter-shelf region IA. Accordingly, it is preferable that the gravitational center lowering control be also executed in at least part of the end region EA.

Figure 13:
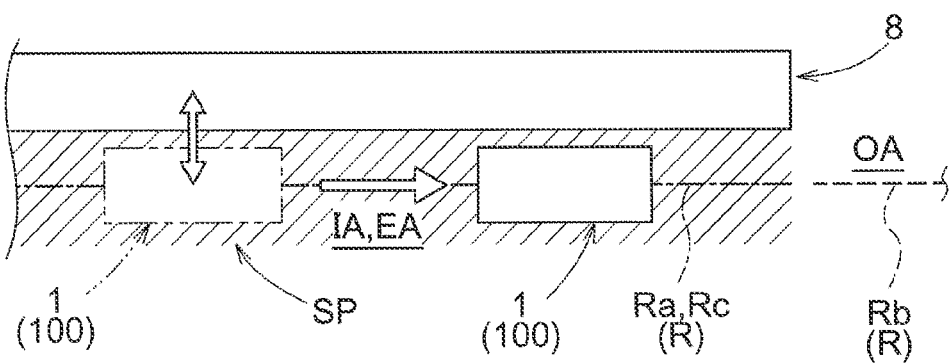
FIG. 13 is an explanatory view illustrating the timing to start the gravitational center lowering control.

As illustrated in FIG. 13, in the present embodiment, a stopping position of the moving body 1 in a case where the container 70 is transferred between the moving body 1 and the container shelf 8 by the transfer machine B is referred to as a transferring stopping position SP. After transferring of the container 70 is completed at a last transferring stopping position SP before the moving body 1 moves out from the inter-shelf region IA or the end region EA to the outside region OA along the travel path R of the moving body 1, the control unit C initiates the gravitational center lowering control before the moving body 1 moves out to the outside region OA. Then, the control unit C maintains a state where the gravitational center lowering control is being executed while the moving body 1 is present in the outside region OA. In this example, in a case where the transfer machine B transfers a subsequent container 70, while the moving body 1 is present in the outside region OA after the moving body 1 moves out to the outside region OA, or after the moving body 1 enters the inter-shelf region IA or the end region EA but before the subsequent transferring is executed, the control unit C maintains a state where the gravitational center lowering control is being executed.

Figure 14:
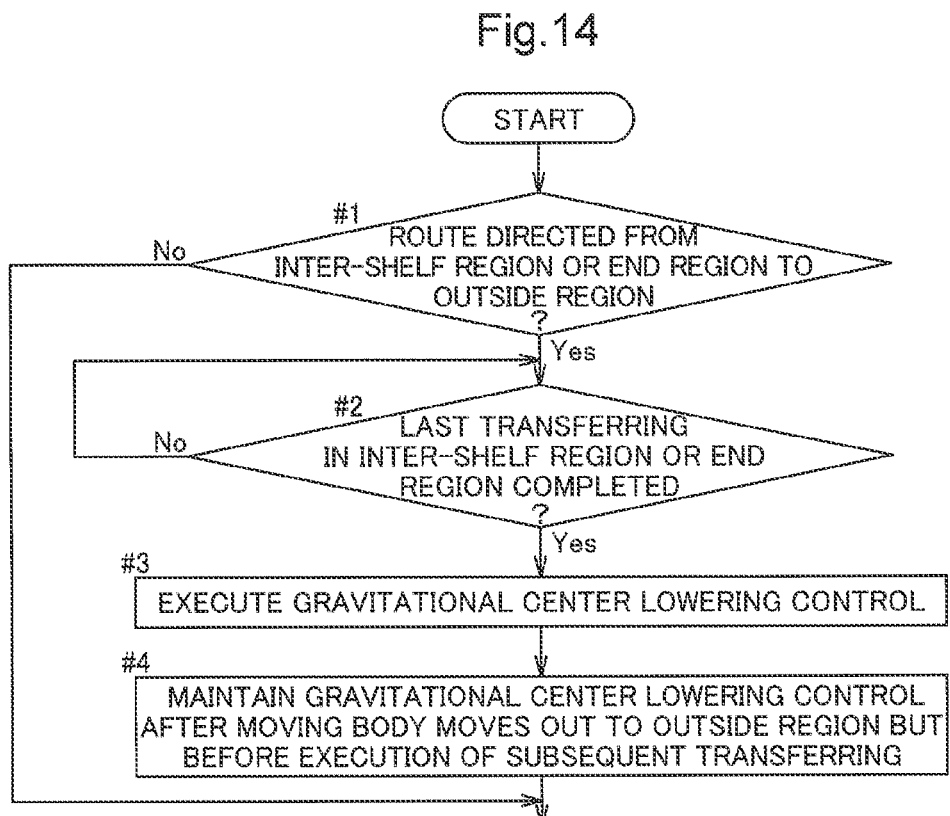
FIG. 14 is a flowchart illustrating a routine in a case where the gravitational center lowering control is executed.

Referring to the flowchart in FIG. 14, the following describes a routine in a case where the gravitational center lowering control is executed.

As illustrated in FIG. 14, the control unit C determines whether or not a route along which the moving body 1 is currently traveling is a route directed from the inter-shelf region IA or the end region EA toward the outside region OA (step #1). The route along which the moving body 1 is traveling is included in a transport command transmitted from the host controller H, for example. In this case, the control unit C performs a route determination based on the transport command.

In a case where the control unit C determines that the route along which the moving body 1 is currently traveling is not the route directed from the inter-shelf region IA or the end region EA toward the outside region OA (step #1: No), the control unit C ends this routine. In a case where the control unit C determines that the route along which the moving body 1 is currently traveling is the route directed from the inter-shelf region IA or the end region EA toward the outside region OA (step #1: Yes), the control unit C determines whether last transferring in the inter-shelf region IA or the end region EA is completed or not (step #2).

In a case where the control unit C determines that last transferring in the inter-shelf region IA or the end region EA is not completed (step #2: No), the process of step #2 is repeated. In a case where the control unit C determines that last transferring in the inter-shelf region IA or the end region EA is completed (step #2: Yes), the control unit C executes the gravitational center lowering control (step #3). The control unit C maintains the execution of the gravitational center lowering control after the moving body 1 moves out from the outside region OA but before the moving body 1 enters the inter-shelf region IA or the end region EA and the transfer machine B transfers the subsequent container 70 (step #4).

With such a configuration, the transport vehicle 100 present in the outside region OA can be made hard to overturn. Further, as described above, in the present embodiment, the moving body 1 is configured to change its advancing direction by rotating around the axial center in the up-down direction on the spot in the direction change region DA. In a case where the moving body 1 changes the advancing direction in such a form, the centrifugal force easily acts on the transport vehicle 100. However, in the direction change region DA (the outside region OA) where the moving body 1 changes the advancing direction, the gravitational center of the whole transport vehicle 100 is lowered by the execution of the gravitational center lowering control. Accordingly, when the moving body 1 changes the advancing direction, the transport vehicle 100 can be made hard to overturn.

OTHER EMBODIMENTS

Next will be described other embodiments of the transport vehicle.

(1) The above embodiment has described a configuration in which the shaking occurrence information acquisition section Cb acquires shaking occurrence information from the host controller H. However, the present embodiment is not limited to this configuration. For example, the transport vehicle 100 may be provided with a shaking sensor and configured to acquire shaking occurrence information based on a detection value from the shaking sensor.

(2) The above embodiment has described a configuration in which the support arm 14 is supported by the moving body 1. However, the present embodiment is not limited to this configuration. For example, the support arm 14 may be configured to be supported by the moving body 1 via other members such as an attachment member fixed to the moving body 1.

(3) The above embodiment has described a configuration in which the arm driving device 15 performs the arm projecting operation using power of the motor 15a. However, the present embodiment is not limited to this configuration. For example, the arm driving device 15 may be configured to include biasing means (for example, a spring) configured to bias the support arm 14 to bring the support arm 14 into a projecting state, and locking means configured to lock the movement of the support arm 14 in the retracted state against the biasing force of the biasing means and to unlock the support arm 14 when the shaking occurrence information acquisition section Cb acquires shaking occurrence information. In this case, when the shaking occurrence information acquisition section Cb acquires the shaking occurrence information, the support arm 14 is unlocked, so that the support arm 14 is changed from the retracted state to the projecting state by the biasing force.

(4) The above embodiment has described a configuration in which the moving body 1 includes the support arms 14 on the opposite sides in the vehicle-body width direction W. However, the present embodiment is not limited to this configuration. For example, the moving body 1 may be configured to include the support arm 14 only on one side in the vehicle-body width direction W.

(5) The above embodiment has described a configuration in which the arm driving device 15 prohibits the execution of the arm projecting operation in the inter-shelf region IA. However, the present embodiment is not limited to this configuration. For example, in a case where an entry prevention fence is provided, the arm driving device 15 may not execute the arm projecting operation on the fence side in a region adjacent to the entry prevention fence. Further, in a case where the support arm 14 does not interfere with the container shelf 8 even when the arm projecting operation is executed, like a case where the distance between the paired container shelves 8 is large, the arm driving device 15 may be configured to permit the execution of the arm projecting operation in the inter-shelf region IA.

(6) The above embodiment has described a configuration in which each of the driven wheels 11b is configured as a caster. However, the present embodiment is not limited to this configuration. For example, the driven wheel 11b on the front side in the vehicle-body front-rear direction L may be a non-driven steerable wheel and may be steered in accordance with the traveling direction.

Figure 15:
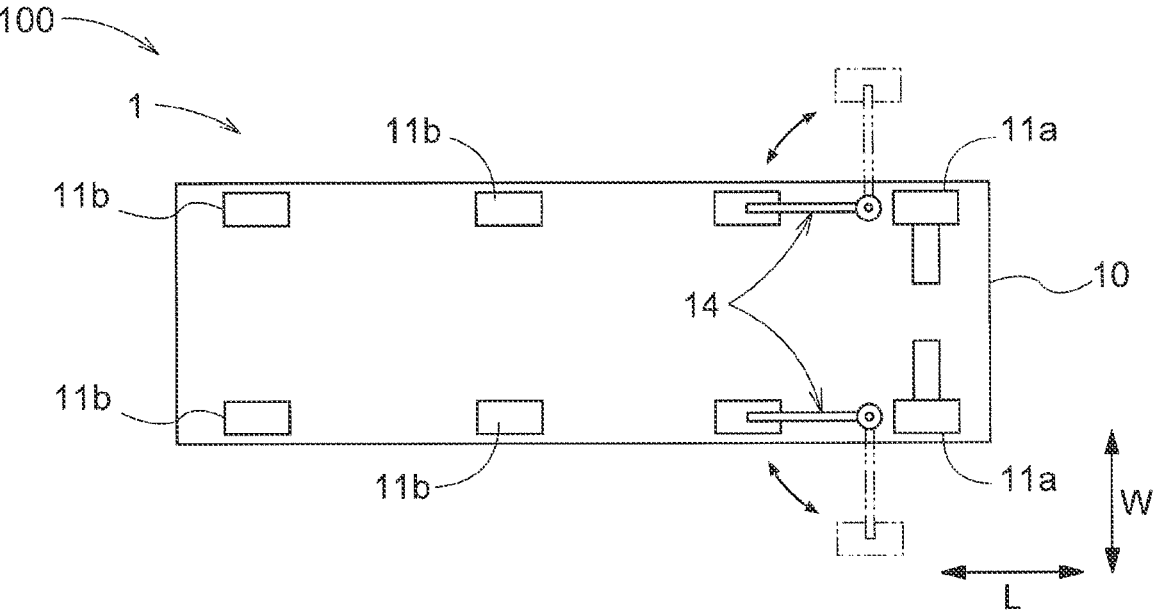
FIG. 15 is an explanatory view illustrating the structure of a moving body according to another embodiment.

(7) The above embodiment has described a configuration in which the support arm 14 of the overturning prevention device 13 is disposed near the driving wheel 11a disposed in the intermediate region 10Am of the moving main body 10. However, the present embodiment is not limited to this configuration. For example, in a case where paired driving wheels 11a and a plurality of driven wheels 11b are provided, the paired driving wheels 11a may be disposed on the rear side of the moving body 1 in the vehicle-body front-rear direction L, and the support arms 14 may be disposed at positions closer to the driving wheels 11a than the driven wheels 11b in the vehicle-body front-rear direction L, as illustrated in FIG. 15.

Figure 16:
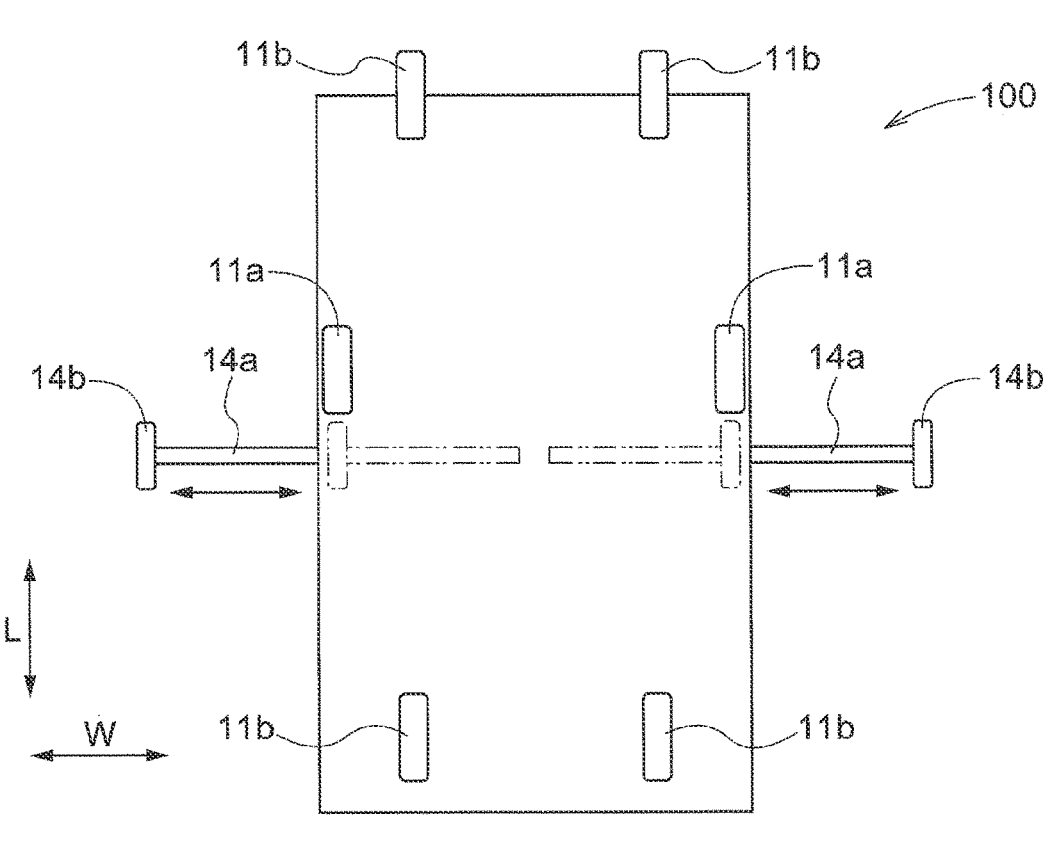
FIG. 16 is an explanatory view illustrating the structure of an overturning prevention device according to another embodiment.
Figure 17:
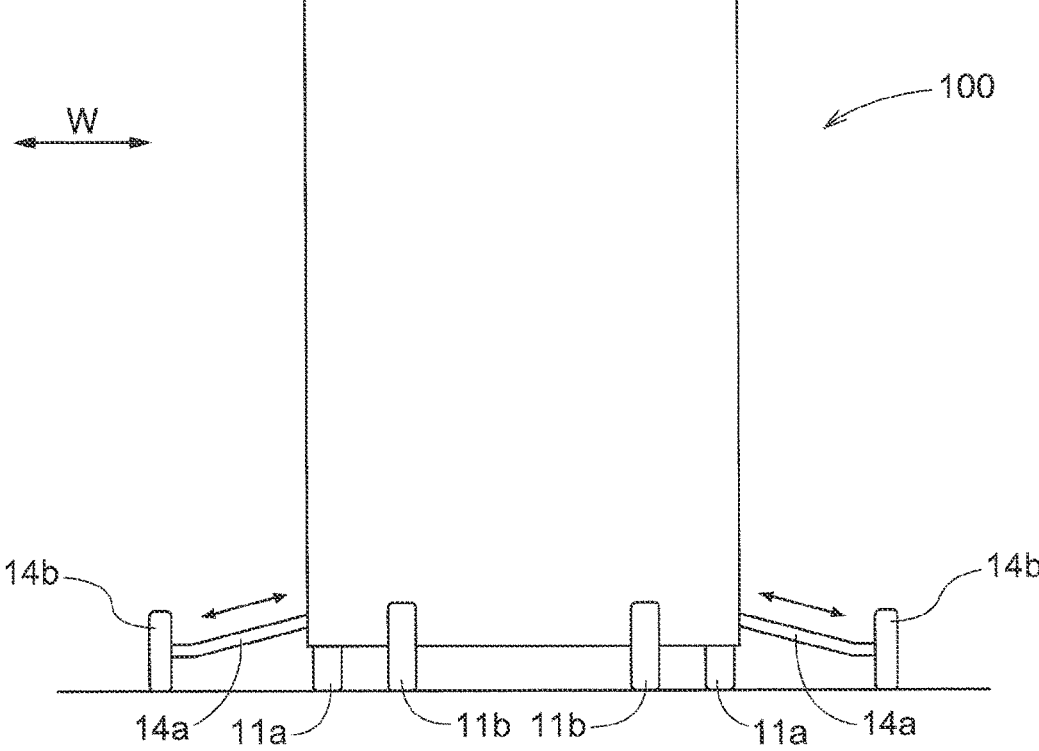
FIG. 17 is an explanatory view illustrating the structure of an overturning prevention device according to another embodiment.

(8) The above embodiment has described a configuration in which the support arm 14 is supported by the moving body 1 swingably around the axial center along the up-down direction, and the support wheel 14b is configured as a caster. However, the present embodiment is not limited to this configuration. For example, the support arm 14 may be configured to be slidably supported by the moving body 1, or the support wheel 14b may not be configured as a caster. As illustrated in FIGS. 16, 17, the support wheel 14b may be configured to be fixed to the arm main body 14a in a state where the rotating shaft is along the vehicle-body width direction W, and the support arm 14 may be configured to be supported slidably diagonally downward relative to the moving body 1 in a plane perpendicular to the vehicle-body front-rear direction L. In this case, the support arm 14 is disposed such that, in the retracted state, a slight gap is formed between the support wheel 14*b* and the travel face, and in the projecting state, the support wheel 14*b* is grounded on the travel face. Note that the arm projecting operation can be implemented by a linear-motion actuator, for example. Further, the support arm 14 may be configured to be supported slidably in the vehicle-body width direction W relative to the moving body 1.

(9) Note that the configuration disclosed in the above embodiment can be applied in combination with the configurations disclosed in other embodiments as long as no inconsistency occurs. In terms of other configurations, the embodiment disclosed in the present specification is also just an example in all respects. Accordingly, various modifications can be made appropriately as far as it does not deviate from the scope of this disclosure.

Overview of Embodiment

The following describes the transport vehicle described above.

The transport vehicle described above is a transport vehicle for transporting an article and includes: a moving body configured to travel along a travel path; a transfer device configured to transfer the article; and an overturning prevention device configured to prevent overturn. The transfer device includes: a mast fixed to the moving body and disposed along an up-down direction; a raising-lowering body configured to be raised and lowered along the mast; and a transfer machine supported by the raising-lowering body. When a direction where the moving body travels is defined as a vehicle-body front-rear direction, a direction perpendicular to the vehicle-body front-rear direction in a top-bottom view is defined as a vehicle-body width direction, a dimension of the moving body in the vehicle-body front-rear direction is defined as a length dimension, a dimension of the moving body in the vehicle-body width direction is defined as a width dimension, and a height from a bottom end of the moving body to an upper end of the mast is defined as a height dimension, the length dimension and the height dimension are larger than the width dimension. The overturning prevention device includes: a shaking occurrence information acquisition section configured to acquire shaking occurrence information indicating that shaking of a travel face where the moving body travels is equal to or more than a predetermined reference value; a support arm supported by the moving body; and an arm driving device configured to drive the support arm. The support arm is configured to be changeable between a projecting state where the support arm projects outwardly in the vehicle-body width direction from the moving body to be grounded on the travel face outside the moving body in the vehicle-body width direction and a retracted state where the support arm is retracted inside the width dimension of the moving body. In a case where the shaking occurrence information acquisition section acquires the shaking occurrence information, the arm driving device executes an arm projecting operation to change the support arm from the retracted state to the projecting state.

In a case where the length dimension and the height dimension of the transport vehicle are larger than the width dimension thereof, when shaking of the travel face occurs due to an earthquake or other factors, the transport vehicle easily inclines greatly in the vehicle-body width direction or overturns.

However, with the above configuration, when shaking occurrence information is acquired, the support arm is brought into the projecting state such that the support arm can be grounded on the travel face outside the moving body. Accordingly, even in a case where shaking occurs on the travel face, it is possible to restrict the transport vehicle from greatly inclining in the vehicle-body width direction and eventually to prevent the transport vehicle from overturning. That is, with the above configuration, it is possible to achieve a transport vehicle that is hard to overturn by shaking of an earthquake or the like.

Here, it is preferable that, in a state where the shaking occurrence information acquisition section acquires no shaking occurrence information, the arm driving device maintain the support arm in the retracted state.

With this configuration, in a state where no shaking occurs on the travel face, the support arm is brought into the retracted state where the support arm is retracted inside the width dimension of the moving body. Accordingly, it is possible to prevent the support arm from disturbing traveling of the transport vehicle when the transport vehicle travels in a path narrow in the vehicle-body width direction.

Further, it is preferable that: the travel path include an inter-shelf region passing through between paired storage shelves disposed to face each other and each configured to store the article, and an outer region outside the inter-shelf region; and the arm driving device prohibit execution of the arm projecting operation in the inter-shelf region.

With this configuration, in the inter-shelf region, the execution of the arm projecting operation is prohibited, thereby making it possible to avoid the support arm from interfering with the storage shelf. Note that, in the inter-shelf region, the storage shelf serves as a support for the transport vehicle to prevent the transport vehicle from overturning. Accordingly, even when the arm projecting operation is not executed, a problem is hard to occur.

Further, it is preferable that: each of the paired storage shelves include a target beam member extending horizontally along a front surface of the each of the paired storage shelves, the front surface facing the travel path; and the mast include a guided member at a height corresponding to the target beam member such that the guided member projects outwardly in the vehicle-body width direction from the mast.

With this configuration, when the transport vehicle inclines in the inter-shelf region, the guided member abuts with the target beam member of the storage shelf, so that the transport vehicle is supported by the storage shelf. Accordingly, even when the arm projecting operation is not executed in the inter-shelf region, it is possible to prevent the transport vehicle from overturning.

Further, it is preferable that: the moving body include driving wheels, a wheel drive source configured to rotationally drive the driving wheels, and driven wheels; the driven wheels be separately disposed on opposite sides across the driving wheels in the vehicle-body front-rear direction; the driven wheels include respective rotating shafts supported in a state where respective relative positions to a main body of the moving body in the up-down direction are fixed; the driving wheels include respective rotating shafts supported in a state where the respective rotating shafts have elasticity in the up-down direction via a suspension mechanism relative to the main body of the moving body; and the support arm be disposed at a position closer to the driving wheels than the driven wheels in the vehicle-body front-rear direction.

In this configuration, the driving wheels are supported by the main body of the moving body via the suspension mechanism. This achieves a configuration that enhances a grounding force of the driving wheels and easily transmits a driving force to the travel face.

In the meantime, in a case where the driving wheels are supported by the main body of the moving body via the suspension mechanism, a function of the driving wheels to support inclination or shaking of a vehicle body when shaking occurs on the travel face is weaker than that of the driven wheels. However, in the above configuration, the support arms are disposed closer to the driving wheels, so that shaking or inclination of the transport vehicle can be supported by the driven wheels and the support arms appropriately. Accordingly, even in a case where shaking occurs on the travel face, it is possible to restrict the transport vehicle from greatly inclining in the vehicle-body width direction and eventually to prevent the transport vehicle from overturning.

Further, it is preferable that: the support arm include an arm main body, and a support wheel disposed to be grounded on the travel face and supported by the arm body; and the support wheel include a rotating shaft supported rotatably relative to the arm main body around an axial center along the up-down direction.

With this configuration, even in a configuration where the support arm is grounded on the travel face all the time, it is possible to avoid the support arm from disturbing traveling of the transport vehicle. Accordingly, a mechanism for vertically moving a grounded part of the support arm is unnecessary, thereby making it possible to easily simplify the configuration of the support arm and the arm driving device.

Further, it is preferable that the support arm be supported by the moving body swingably around an axial center along the up-down direction.

With this configuration, it is possible to change the support arm between the projecting state and the retracted state by just supporting the swinging shaft of the support arm by the moving body, for example. Accordingly, it is possible to easily simplify a support structure of the support arm by the moving body.

INDUSTRIAL APPLICABILITY

The technology according to this disclosure can be used for a transport vehicle for transporting an article.

What is claimed is:

1. A transport vehicle for transporting an article, the transport vehicle comprising:

a moving body configured to travel along a travel path;

a transfer device configured to transfer the article; and an overturning prevention device configured to prevent overturn, wherein:

the transfer device comprises:

a mast fixed to the moving body and disposed along an up-down direction;

a raising-lowering body configured to be raised and lowered along the mast; and a transfer machine supported by the raising-lowering body;

when a direction where the moving body travels is defined as a vehicle-body front-rear direction, a direction perpendicular to the vehicle-body front-rear direction in a top-bottom view is defined as a vehicle-body width direction, a dimension of the moving body in the vehicle-body front-rear direction is defined as a length dimension, a dimension of the moving body in the vehicle-body width direction is defined as a width dimension, and a height from a bottom end of the moving body to an upper end of the mast is defined as a height dimension, the length dimension and the height dimension are larger than the width dimension;

the overturning prevention device comprises:

a shaking occurrence information acquisition section configured to acquire shaking occurrence information indicating that shaking of a travel face where the moving body travels is equal to or more than a predetermined reference value;

a support arm supported by the moving body; and an arm driving device configured to drive the support arm;

the support arm is configured to be changeable between a projecting state where the support arm projects outwardly in the vehicle-body width direction from the moving body to be grounded on the travel face outside the moving body in the vehicle-body width direction and a retracted state where the support arm is retracted inside the width dimension of the moving body; and in a case where the shaking occurrence information acquisition section acquires the shaking occurrence information, the arm driving device executes an arm projecting operation to change the support arm from the retracted state to the projecting state.

2. The transport vehicle according to claim 1, wherein, in a state where the shaking occurrence information acquisition section acquires no shaking occurrence information, the arm driving device maintains the support arm in the retracted state.

3. The transport vehicle according to claim 1, wherein:

the travel path comprises an inter-shelf region passing through between paired storage shelves disposed to face each other and each configured to store the article, and an outer region outside the inter-shelf region; and the arm driving device prohibits execution of the arm projecting operation in the inter-shelf region.

4. The transport vehicle according to claim 3, wherein:

each of the paired storage shelves comprises a target beam member extending horizontally along a front surface of the each of the paired storage shelves, the front surface facing the travel path; and the mast comprises a guided member at a height corresponding to the target beam member such that the guided member projects outwardly in the vehicle-body width direction from the mast.

5. The transport vehicle according to claim 1, wherein:

the moving body comprises driving wheels, a wheel drive source configured to rotationally drive the driving wheels, and driven wheels;

the driven wheels are separately disposed on opposite sides across the driving wheels in the vehicle-body front-rear direction;

the driven wheels comprise respective rotating shafts supported in a state where respective relative positions to a main body of the moving body in the up-down direction are fixed;

the driving wheels comprise respective rotating shafts supported in a state where the respective rotating shafts have elasticity in the up-down direction via a suspension mechanism relative to the main body of the moving body; and the support arm is disposed at a position closer to the driving wheels than the driven wheels in the vehicle-body front-rear direction.

6. The transport vehicle according to claim 1, wherein:

the support arm comprises an arm main body, and a support wheel disposed to be grounded on the travel face and supported by the arm body; and the support wheel comprises a rotating shaft supported rotatably relative to the arm main body around an axial center along the up-down direction.

7. The transport vehicle according to claim 6, wherein the support arm is supported by the moving body swingably around an axial center along the up-down direction.

\* \* \* \* \*